(12) United States Patent
Matsumoto et al.

(10) Patent No.: US 8,175,748 B2
(45) Date of Patent: May 8, 2012

(54) MOBILE DEVICE, MOVING SYSTEM, MOVING METHOD, AND MOVING PROGRAM

(75) Inventors: Kosei Matsumoto, Yokohama (JP); Toshio Moriya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1165 days.

(21) Appl. No.: 11/923,747

(22) Filed: Oct. 25, 2007

(65) Prior Publication Data
US 2009/0012667 A1 Jan. 8, 2009

(30) Foreign Application Priority Data
Jul. 4, 2007 (JP) .................................. 2007-176259

(51) Int. Cl.
G05B 19/18 (2006.01)
(52) U.S. Cl. ........ 700/253; 700/215; 700/214; 700/216; 700/26
(58) Field of Classification Search ............... 701/26, 701/210, 302; 700/113, 215, 225, 226, 229, 700/253, 214; 244/3.15; 901/1
See application file for complete search history.

(56) References Cited

U.S. PATENT DOCUMENTS

| | | | | |
|---|---|---|---|---|
| 5,828,322 A * | 10/1998 | Eberhard | ...................... | 340/988 |
| 6,064,926 A * | 5/2000 | Sarangapani et al. | .......... | 701/26 |
| 6,085,130 A * | 7/2000 | Brandt et al. | .................... | 701/26 |
| 6,157,875 A * | 12/2000 | Hedman et al. | .................... | 701/26 |
| 6,600,418 B2 * | 7/2003 | Francis et al. | ............. | 340/572.1 |
| 6,691,947 B2 * | 2/2004 | La Fata | ......................... | 244/3.19 |
| 6,747,560 B2 * | 6/2004 | Stevens, III | ................ | 340/572.4 |
| 6,845,303 B1 * | 1/2005 | Byler | ............................... | 701/13 |
| 6,917,855 B2 * | 7/2005 | Gonzalez-Banos et al. | .. | 700/245 |
| 7,031,802 B2 * | 4/2006 | Bash et al. | ..................... | 700/214 |
| 7,139,640 B2 * | 11/2006 | Chae et al. | ..................... | 700/226 |
| 7,236,121 B2 * | 6/2007 | Caber | ............................. | 342/62 |
| 7,321,305 B2 * | 1/2008 | Gollu | ......................... | 340/572.1 |
| 7,412,325 B1 * | 8/2008 | Tannenbaum et al. | ........ | 701/204 |
| 7,474,213 B2 * | 1/2009 | Tsuboi | ........................ | 340/572.1 |
| 7,501,780 B2 * | 3/2009 | Yamamoto | .................... | 318/587 |
| 7,554,282 B2 * | 6/2009 | Nakamoto | .................... | 318/587 |
| 7,558,670 B2 * | 7/2009 | Nagasawa | ..................... | 701/209 |
| 7,636,621 B2 * | 12/2009 | Lee et al. | ........................ | 701/23 |
| 8,010,230 B2 * | 8/2011 | Zini et al. | ....................... | 700/245 |
| 2002/0070862 A1 * | 6/2002 | Francis et al. | ............. | 340/572.1 |
| 2003/0055542 A1 * | 3/2003 | Knockeart et al. | ............. | 701/26 |

(Continued)

FOREIGN PATENT DOCUMENTS
JP 2005-320074 11/2005
(Continued)

*Primary Examiner* — Khoi Tran
*Assistant Examiner* — Brian J Broadhead
(74) *Attorney, Agent, or Firm* — Antonelli, Terry, Stout & Kraus, LLP.

(57) ABSTRACT

A technology is provided that easily acquires the location where an article is placed and then moves to that location, even in cases where the article was originally placed in a location shielded from GPS radio wave, and subsequently moved to another location. Marks and RFID tags are affixed to a movable tray. A transfer robot includes a camera, a reader, and a sensor. The transfer robot detects the tray location from the location of a region in an image photographed by the camera that matches mark information. Furthermore, the reader in the transfer robot detects the tray location from the intensity of a radio wave whose information, when read, matches an ID retained in the RFID tag. The transfer robot moves with the camera and the reader, detecting the tray that is the target destination.

13 Claims, 11 Drawing Sheets

U.S. PATENT DOCUMENTS

| | | | |
|---|---|---|---|
| 2003/0125832 A1* | 7/2003 | Nakashima | 700/213 |
| 2004/0193334 A1* | 9/2004 | Carlsson et al. | 701/9 |
| 2006/0106496 A1* | 5/2006 | Okamoto | 700/253 |
| 2007/0136152 A1 | 6/2007 | Dunsker et al. | |
| 2010/0241346 A1* | 9/2010 | Waris | 701/201 |
| 2010/0312476 A1* | 12/2010 | Mueller et al. | 701/302 |
| 2011/0015816 A1* | 1/2011 | Dow et al. | 701/23 |

FOREIGN PATENT DOCUMENTS

JP 2007-161485 6/2007

* cited by examiner

FIG. 3

| LOCATION | ATTRIBUTE | TIME 1 | TIME 2 | ... |
|---|---|---|---|---|
| (X1,Y1,Z1) | OBSTRUCTION PROBABILITY | X11 | X11 | ... |
| | TRAY ID | aaa1 | aaa1 | ... |
| | IMAGE INFORMATION | rgb11 | rgb11 | ... |
| | SENSOR DATA | s1 | s1 | ... |
| | TEMPERATURE INFORMATION | t1 | t1 | ... |
| | HUMIDITY INFORMATION | h1 | h1 | ... |
| | RADIO WAVE INFORMATION | rw2 | rw1 | ... |
| | SOUND INFORMATION | so1 | so1 | ... |
| | ILLUMINATION INFORMATION | i1 | i1 | ... |
| | MIRROR SURFACE IMAGE INFORMATION | li11 | li12 | ... |
| | WIND INFORMATION | Wd1/ws1 | Wd1/ws1 | ... |
| | ODOR INFORMATION | sm1 | sm1 | ... |
| | ... | ... | ... | ... |
| (X1,Y1,Z2) | OBSTRUCTION PROBABILITY | X11 | X12 | ... |
| | TRAY ID | bbb1 | — | ... |
| | IMAGE INFORMATION | rgb12 | rgb12 | ... |
| | SENSOR DATA | s1 | s2 | ... |
| | TEMPERATURE INFORMATION | t1 | t2 | ... |
| | HUMIDITY INFORMATION | h1 | h2 | ... |
| | RADIO WAVE INFORMATION | rw1 | rw1 | ... |
| | SOUND INFORMATION | so1 | so1 | ... |
| | ILLUMINATION INFORMATION | i1 | i1 | ... |
| | MIRROR SURFACE IMAGE INFORMATION | li21 | li22 | ... |
| | WIND INFORMATION | Wd1/ws2 | Wd1/ws2 | ... |
| | ODOR INFORMATION | sm1 | sm1 | ... |
| | ... | ... | ... | ... |
| ... | ... | ... | ... | ... |

FIG. 4

| TRAY ID | MARK INFORMATION | | | | | SHORT-RANGE COMMUNICATION TAG ID | LONG-RANGE COMMUNICATION TAG ID |
|---|---|---|---|---|---|---|---|
| aaa1 | ○ | ○ | ○ | ○ | ○ | xxxx11 | yyyy11 |
| | | | | | | xxxx12 | yyyy12 |
| | | | | | | xxxx13 | yyyy13 |
| | | | | | | xxxx14 | yyyy14 |
| | | | | | | xxxx15 | yyyy15 |
| aaa2 | ▷ | ▷ | ▷ | ▷ | ▷ | xxxx21 | yyyy21 |
| | | | | | | xxxx22 | yyyy22 |
| | | | | | | xxxx23 | yyyy23 |
| | | | | | | xxxx24 | yyyy24 |
| | | | | | | xxxx25 | yyyy25 |
| ⋮ | | | | | | ⋮ | ⋮ |

143b

FIG.9
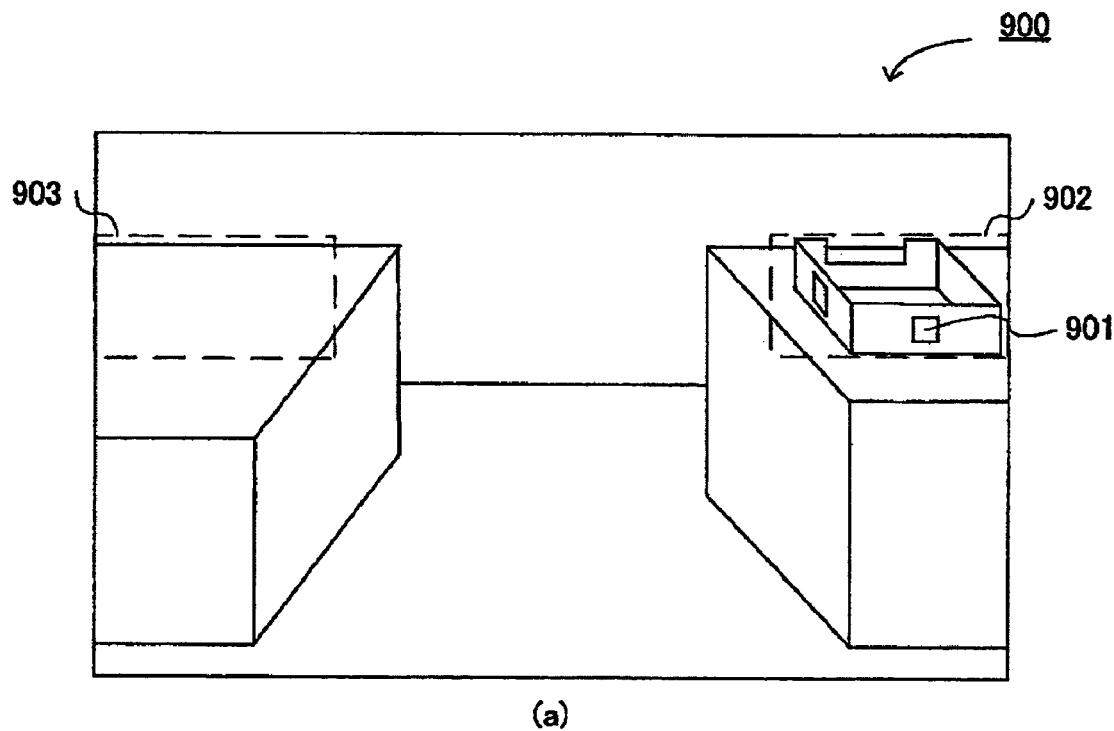
(a)
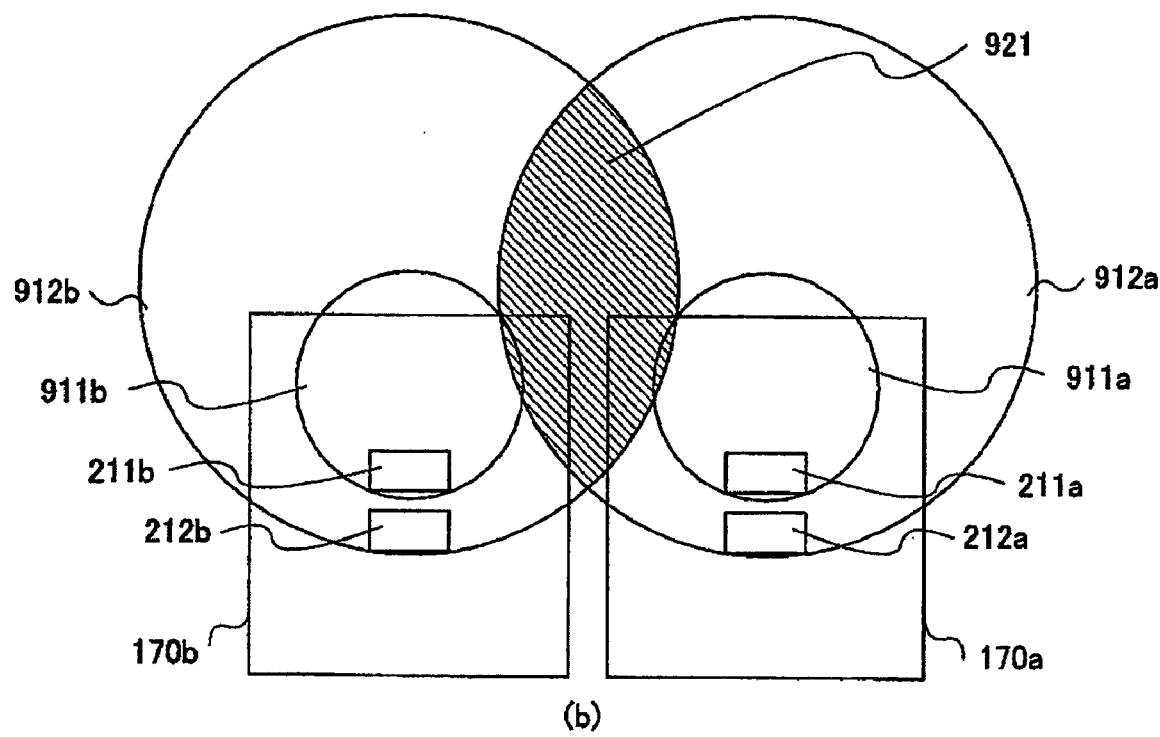
(b)

MOBILE DEVICE, MOVING SYSTEM, MOVING METHOD, AND MOVING PROGRAM

BACKGROUND OF THE INVENTION

1. Field of the Invention

The present invention relates to mobile devices.

2. Description of the Related Art

RFID (Radio Frequency Identification) technology may conceivably be applied to article management. For example, in inventory management, by affixing an RFID tag (hereinafter, tag) to each article, and by reading an ID within that tag, it is possible to acquire information on the type and quantity of that article. By conducting this process when loading or unloading from a warehouse or other repository, inventory management becomes easier.

In addition, a technology that searches for the location of an article stored in a warehouse or other repository, and to which an RFID tag is affixed, is described in Patent Reference 1. Patent Reference 1 describes a technology whereby a robot acquires the location of an RFID tag.

Patent Reference 1: Japanese Patent Laid-Open Publication No. 2005-320074

SUMMARY OF THE INVENTION

In typical technologies for the article management that use RFID technology, no consideration is made for cases when, once an article is placed on a shelf, etc., the article is moved to another location. Consequently, in cases where an article placed in one location is to be used after being moved to another location, it is necessary to search for the article manually using human resources or another method.

In addition, in the technology described in Patent Reference 1, estimations of the robot location are conducted using GPS (Global Positioning System). Consequently, since it is difficult to estimate the robot location in places such as indoor areas which are shielded from GPS signals, it is difficult to find the location of an article over the whole of the working area.

It is an object of the invention, being devised in light of these circumstances, to provide a technology by which the location where an article is placed is acquired and movement to that location is easily realized, even in cases where the article that was once placed in a location shielded from GPS signals is moved to a different place.

The present invention, being devised in order to achieve the above object, is a mobile device that moves to a movable target object and comprises the following: a target object detection unit for detecting the target object; a driving device for moving the mobile device; a storage device for storing environment map information, this information including target object location information and map information; a present location acquisition unit for acquiring the present location of the mobile device from the map information; a search unit for searching for a route from the present location of the mobile device to the location of the target object, using the map information, the present location of the mobile device, and the location of the target object; and a drive control unit for controlling the driving device so as to move along the searched route. The search unit searches for a route from the present location of the mobile device to the location of the target object indicated by the location information included in the environment map information. In cases where the target object is detected by the target object detection unit while moving along the route found by the search, the search unit searches for a new route from the present location of the mobile device at the time of the detection, to the detected location of the target object. The drive control unit then causes the mobile device to move along the new route found by the search.

According to the technology in the invention, even in cases where the location of the movement target changes, that location can be detected. As a result, even in cases where, for example, an unloading location is movable, it is possible to transfer packages to the changed unloading location.

BRIEF DESCRIPTION OF THE DRAWINGS

FIG. 3 is an exemplary view showing environment map information in accordance with the first embodiment;

FIG. 4 is an exemplary view showing environment map information in accordance with the first embodiment;

FIG. 9 is an exemplary view illustrating operation whereby the present location of the transfer robot is acquired, in accordance with the first embodiment;

DETAILED DESCRIPTION OF THE PREFERRED EMBODIMENTS

Hereinafter, a first embodiment of the present invention will be described in detail, with reference to the accompanying drawings.

First Embodiment

First, a first embodiment will be described.

Figure 1:
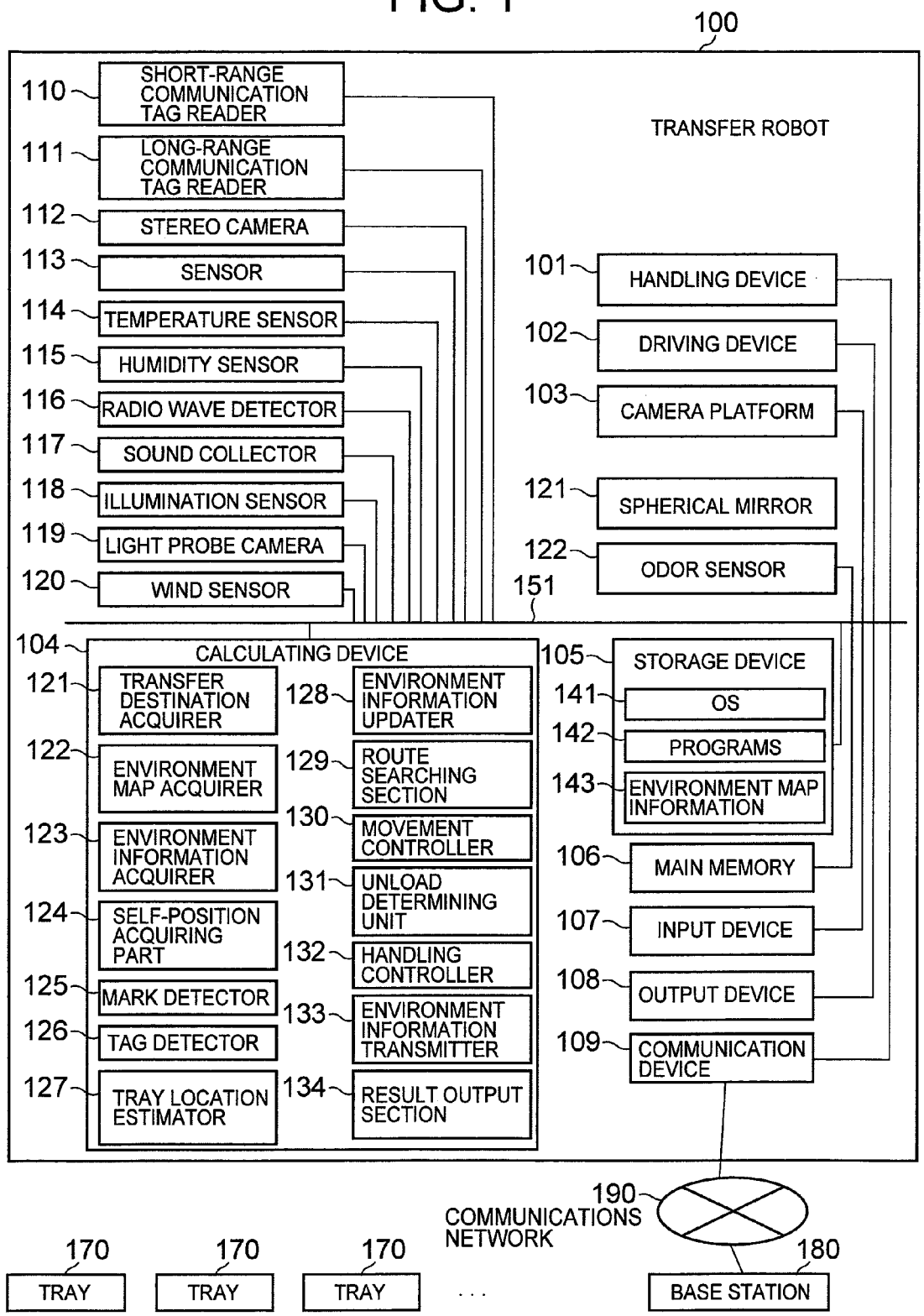
FIG. 1 is a block diagram showing a configuration example in accordance with the first embodiment of the invention.

An example configuration of the first embodiment will be described with reference to FIG. 1.

The system of the present embodiment is comprised of a transfer robot 100, a plurality of trays 170, and a base station 180. The transfer robot 100 and the base station 180 are connected via a communications network 190.

Each of the trays 170 is not fixed, but is movable. A mark, a short-range communication RFID tag, and a long-range communication RFID tag are attached to each of the trays 170. The details of these trays 170 will be described in a later section.

The transfer robot 100 acquires a location for a specified tray 170 from environment map information 143 sent from the base station 180, as well as from self-acquired information, and moves to that location. Details of the environment map information 143 will be described in a later section. At this point, the transfer robot 100, after having moved to the target tray among the trays 170, may place a transfer object it has been carrying on the tray 170. In addition, the transfer robot 100 may also transfer an object in the tray 170 to a different location. Hereinafter, the case wherein the transfer robot 100 places a transfer object it had been carrying on one of the trays 170 will be described as an example.

The base station 180 is an information processor having communication functions, such as those of a server. The base station 180 has a storage device (not shown in the drawings). This storage device contains the environment map information 143. The base station 180 sends the environment map information 143 read from the storage device according to requests from the transfer robot 100. Such a device is equivalent to that of the conventional art and a detailed description thereof will be omitted.

The communications network 190 is an arbitrary network such as a wireless LAN (Local Area Network).

An example configuration of the transfer robot 100 will now be described with reference to FIG. 1.

The transfer robot 100 includes: a handling device 101, a driving device 102, a camera platform 103, a calculating device 104, a storage device 105, a main memory 106, an input device 107, an output device 108, a communication device 109, a short-range communication tag reader 110, a long-range communication tag reader 111, a stereo camera 112, a sensor 113, a temperature sensor 114, a humidity sensor 115, a radio wave detector 116, a sound collector 117, an illumination sensor 118, a light probe camera 119, a wind sensor 120, an odor sensor 122a, etc. These are connected by connection wires 151. In addition, the transfer robot 100 includes a spherical mirror 121a.

The handling device 101 holds the transfer object while the transfer robot 100 is moving, and places the transfer object upon one of the trays 170. The shape and configuration of the handling device 101 are arbitrary, and may for example comprise a manipulator and hand configuration, a belt conveyor, or a crane configuration. The driving device 102 moves the transfer robot 100. The shape and configuration of the driving device 102 are arbitrary, and may for example comprise a vehicle-type, ship-type, or leg-type configuration. The camera platform 103 changes the height, angle, and elevation angle of the short-range communication tag reader 110, the long-range communication tag reader 111, the stereo camera 112, the sensor 113, the temperature sensor 114, the humidity sensor 115, the radio wave detector 116, the sound collector 117, the illumination sensor 118, the light probe camera 119, the wind sensor 120, the spherical mirror 121a, the odor sensor 122a, etc.

The short-range communication tag reader 110 reads the tag IDs of the short-range communication RFID tags attached to each of the trays 170. The long-range communication tag reader 111 reads the tag IDs of the long-range communication RFID tags attached to each of the trays 170. The stereo camera 112 photographs the vicinity of the transfer robot 100. The sensor 113 may be any device that can measure the location of a target object; for example, a laser sensor, an infrared sensor, or an ultrasonic sensor. It should be appreciated that the scanning range of the sensor 113 is arbitrary. Herein, the sensor 113 is taken to be a laser sensor capable of scanning in the horizontal direction. The temperature sensor 114 is for example a thermistor or other device, and acquires a temperature reading. The humidity sensor 115 is, for example, a polymer film humidity sensor, and acquires a humidity reading. The radio wave detector 116 is, for example, an antenna, and detects radio waves of an arbitrary frequency band range. The sound collector 117 is, for example, a microphone, and acquires a sound volume reading. The illumination sensor 118 is, for example, a device using a phototransistor or photodiode, and acquires an illumination reading. It should be appreciated that the illumination sensor 118 may also measure luminance. The light probe camera 119 photographs the spherical mirror 121a. The wind sensor 120 measures at least one of the following: wind speed, airflow, or wind direction. The wind sensor 120 is not particularly limited to technology that measures wind speed, airflow, or wind direction, and may, for example, measure such quantities from the number of revolutions of a cup anemometer within a predetermined period of time, the direction of a vane, temperature change, etc. In addition, the wind speed, airflow, wind direction readings, etc. acquired by the wind sensor 120 may be corrected according to the movement speed and movement direction of the transfer robot 100. The spherical mirror 121a is a sphere with a mirror surface. The spherical mirror 121a reflects conditions in the vicinity of the transfer robot 100. The light probe camera 119 is capable of generating a light probe image from the image obtained by photographing the spherical mirror 121a. The odor sensor 122a acquires a reading for the absence or presence of particular substances and the odor intensity thereof. This odor sensor 122a comprises, for example, one or more odor-sensing elements (for example, high-sensitivity oxide semiconductors), or a gas chromatograph.

The storage device 105 is a readable or writable device, such as a HDD (Hard Disk Drive) or silicon disk. The storage device 105 stores an OS (Operating System) 141, programs 142, the environment map information 143, etc. The programs 142 implement functions to be hereinafter described. The environment map information 143 includes information on the location of the trays 170, map information, etc.

The calculating device 104 is for example a CPU (Central Processing Unit) or other device. The calculating device 104, by executing the programs 142 loaded into the main memory 106, implements devices such as a transfer destination acquirer 121, an environment map acquirer 122, an environment information acquirer 123, a self-position acquiring unit 124, a mark detector 125, a tag detector 126, a tray location estimator 127, an environment information updater 128, a route searching section 129, a movement controller 130, an unload determining unit determining unit 131, a handling controller 132, an environment information transmitter 133, and a result output section 134. The transfer destination acquirer 121 accepts input information relating to one of trays 170 (i.e. the transfer destination). The environment map acquirer 122 acquires the environment map information 143. The environment information acquirer 123 controls the camera platform 103 and acquires measured values and images from the stereo camera 112, the sensor 113, the temperature sensor 114, the humidity sensor 115, the radio wave detector 116, the sound collector 117, the illumination sensor 118, the light probe camera 119, the wind sensor 120, and the odor sensor 122a. The self-position acquiring unit 124 acquires the present location of the transfer robot 100 from both the measured values acquired by the environment information acquirer 123, and the map information included in the environment map information 143. The mark detector 125 detects the marks attached to the trays 170 from the image data obtained by the stereo camera 112. The tag detector 126 detects the tag IDs attached to the trays 170 from the radio waves received by the short-range communication tag reader 110 and the long-range communication tag reader 111. The tray location estimator 127 estimates the locations of the trays 170. The environment information updater 128 updates the information within the environment map information 143 with the information acquired by the stereo camera 112, the sensor 113, the temperature sensor 114, the humidity sensor 115, the radio wave detector 116, the sound collector 117, the illumination sensor 118, the light probe camera 119, the wind sensor 120, the odor sensor 122a, etc. Hereinafter, the information acquired by the stereo camera 112, the sensor 113, the temperature sensor 114, the humidity sensor 115, the radio wave detector 116, the sound collector 117, the illumination sensor 118, the light probe camera 119, the wind sensor 120, the odor sensor 122a, etc., will be collectively referred to as environment information. The route searching section 129 searches for a route to the movement destination, i.e., to one of the trays 170. The movement controller 130 controls the driving device 102 so as to move following the route found by the search. The unload determining unit 131 determines whether or not it is possible to unload the transfer object at the target location, i.e., at one of the trays 170. The handling controller 132 controls the handling device 101 to lower the transfer object at the target location, i.e., at one of the trays 170. The environment information transmitter 133 outputs the updated environment map information 143 to the base station 180 and the like. The result output section 134 outputs results to the output device 108, the communication device 109, etc.

The input device 107 is, for example, a keyboard, mouse, microphone, or touch panel. The output device 108 is, for example, a display, speaker, or printer. The communication device 109 is for connection to the communications network 190, and is, for example, a wireless LAN device.

It should be appreciated that the functions described above may also be realized by hardware such as LSI (Large Scale Integration). In addition, these functions may also be realized only by hardware or software, or by a combination of the both. In addition, the programs for implementing the above functions and the data representing the measured values from the sensors may also be obtained from a storage medium such as a CD-ROM (Compact Disc Read Only Memory), or alternatively, may be acquired from another device over a network.

In addition, the above-described hardware and software may also be selectively implemented according to the particular embodiment.

In addition, the foregoing devices and functions need not be all included in a single transfer robot 100.

In addition, the respective numbers of the stereo camera 112, the sensor 113, the temperature sensor 114, the humidity sensor 115, the radio wave detector 116, sound collector 117, the illumination sensor 118, the light probe camera 119, the wind sensor 120, the spherical mirror 121a, and the odor sensor 122a included in the transfer robot 100 are arbitrary. For example, a sensor system may be used, wherein a plurality of sensors 113 with a narrow scanning range are attached so as to increase the scanning range.

Next, an example configuration of one of the trays 170 will be described with reference to FIG. 2.

Figure 2:
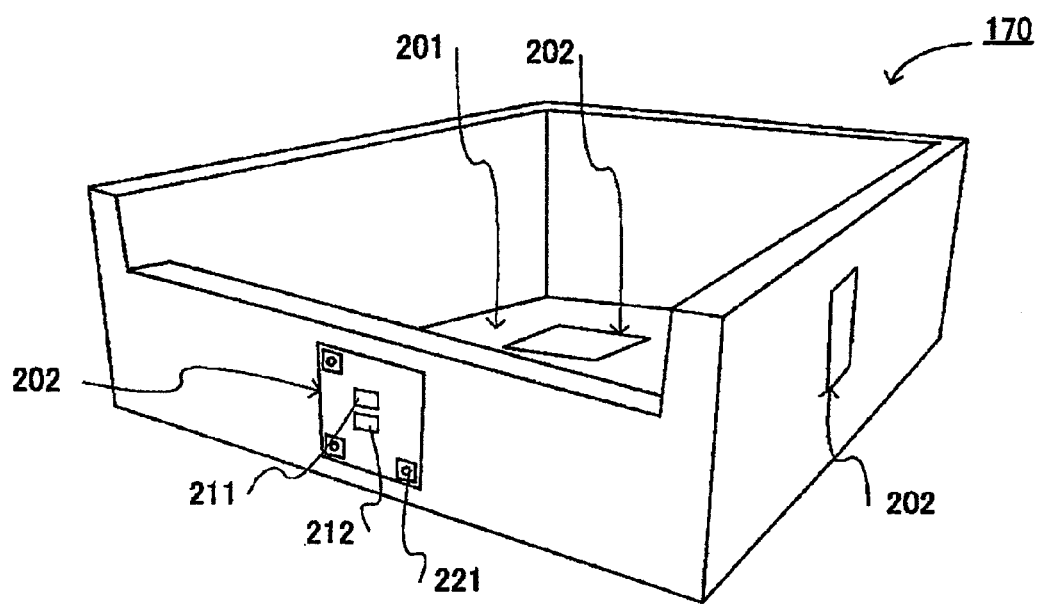
FIG. 2 is a schematic view showing a configuration example of a tray in accordance with the first embodiment.

In FIG. 2, a tray 170 has a space 201, a plurality of marks 202, and the like.

The space 201 is a region into which objects are placed.

The marks 202 are attached to locations, for example, the respective sides of the space 201 and the tray 170, whereby the orientation and height of the tray 170 can be ascertained. In the present embodiment, in each tray 170, a total of five marks 202 are attached: one in the space 201, and one upon each of the sides of the tray 170.

Each mark 202 includes an RFID tag 211, an RFID tag 212, an identification area 221, etc. The RFID tag 211 can communicate only in a narrow region near the tray 170. The RFID tag 212 can communicate in a region wider than that of the RFID tag 211. Each of the RFID tag 211 and RFID tag 212 retains unique information. Hereinafter, this information will be referred to as a tag ID. The identification area 221 is used by the stereo camera 112 to estimate the tray ID, location, positioning, etc. This identification area 221 is, for example, a barcode or two-dimensional barcode, and may be any shape and color, so long as it is possible for the stereo camera 112 to estimate the tray ID, location, positioning, etc. therefrom. Either the color of the identification area 221, its shape, or a combination thereof, differs depending on the surface of the tray 170. In so doing, it is possible to specify the surface of the tray 170 to which that mark 202 is attached. Thus, it is possible to accommodate cases wherein, for example, placing a transfer object into one of the trays 170, as well as taking an object from the space 201, can be conducted only from a particular direction of the tray 170.

It should be appreciated that in the present embodiment, the tray ID, location, and positioning of one of the trays 170 are determined by the identification area 221, but the invention is not limited thereto. A configuration that can determine the tray ID, location, and positioning of one of the trays 170 by combining the marks 202 and the identification area 221 may also be used. In addition, the respective marks 202 and identification areas 221 for different trays 170 may themselves be different, or may be identical.

In addition, the identification area 221 and the marks 202 may also be painted or otherwise applied directly to the trays 170, or may be applied as printed seals. In addition, since LED (Light Emitting Diode) or organic EL (Electroluminescence) displays, LCD displays, etc. can display shapes and color patterns, these may be used for determining the tray ID, location, positioning, etc. In addition, the tray ID, location, and positioning may also be determined using the shapes and colors of the trays themselves. Combinations of the above may also be used.

In addition, when the transfer robot 100 places an object in one of the trays 170 or takes an object placed in one of the trays 170, in the present embodiment it is assumed that it is possible to place the object in, or take the object from, only one surface of the tray. This number of surfaces on which an object can be placed or from which an object can be taken is arbitrary, but herein will be taken to be possible for only one surface.

In addition, the sizes and shapes of the trays 170 are arbitrary, so long as the trays 170 are movable objects having target locations to which the transfer robot 100 can move. The technology by which one of the trays 170 moves is arbitrary, and movement may for example be done by a person or another device (not shown in the drawings), or alternatively, may also move autonomously with a self-propelling device (not shown in the drawings).

In addition, respective types of the RFID tag 211 and the RFID tag 212 are not particularly limited, and for example may be passive tags, for which an internal battery is unnecessary, or active tags, which house an internal battery.

Next, an example of the environment map information 143 will be described with reference to FIGS. 3 and 4.

In the present embodiment, the environment map information 143 includes two tables. Hereinafter, when differentiating these tables in the description thereof, these will be referred to as "environment map information 143a" and "environment map information 143b".

In addition, in the present embodiment, the movable region of the transfer robot 100 is divided into a plurality of sectors in respective longitudinal, lateral, and height directions. Environment information for each of these divided sectors is stored in the environment map information 143. In other words, environment information for a 3-dimensional map is stored in the environment map information 143. Hereinafter, these divided sectors will be referred to as grid.

First, the environment map information 143a, an example of which is shown in FIG. 3, will be described. Primarily, information relating to the map of the movable region of the transfer robot 100 is stored as the environment map information 143a.

In FIG. 3, the environment map information 143a, for each grid, includes a location 301, an obstruction probability 302, a tray ID 303, image information 304, sensor data 305, temperature information 306, humidity information 307, radio wave information 308, sound information 309, illumination information 310, mirror surface image information 311, wind information 312, odor information 313, etc. This plurality of information is stored every time this plurality of information is acquired. In the example in FIG. 3, all information in the same column such as the location 301, the obstruction probability 302, the tray ID 303, the image information 304, the sensor data 305, the temperature information 306, the humidity information 307, the radio wave information 308, the sound information 309, the illumination information 310, the mirror surface image information 311, the wind information 312, and the odor information 313, is information for each grid, acquired at the same time.

Herein, the foregoing information for each grid may be taken to have been acquired at the same time if such was acquired at exactly the same time, or may be taken to have been acquired at the same time if such was acquired within an arbitrary time period, such as for example 10 minutes. Specifically, the "Time 1" in FIG. 3 may be taken to mean, for example, "2006.12.01 12:00:00", or alternatively may be taken to mean, for example, "2006.12.01 12:00:00~2006.12.01 12:10:00." It should be appreciated that, in the case where environment information acquired within an arbitrary time period is taken to have been acquired at the same time, this arbitrary time is not particularly limited, and may for example be the time required to transfer a package once, or alternatively, may be a fixed time period.

The location 301 is location information of the grid. In the present embodiment, the location of a grid is indicated with XYZ coordinates, taking an arbitrary point on the map as an origin. Hereinafter, this coordinate system will be referred to as the environment coordinate system.

The obstruction probability 302 is the probability that an obstruction exists at the grid of location 301. This existence probability is arbitrary, and may for example be the number of times obstructions are detected versus the number of times the transfer robot 100 moves in the vicinity of the grid of location 301.

The tray ID 303 is identification information for the tray 170 located at the grid of location 301.

The image information 304 is image data that is acquired by the stereo camera 112 at the grid of location 301. The sensor data 305 is sensor data that is acquired by the sensor 113 at the grid of location 301. This plurality of information is data acquired in advance by the transfer robot 100 using each of the stereo camera 112 and the sensor 113 at the location 301, in an initial state that serves as a standard. In cases where there is a difference between this image information 304 and sensor data 305, and the data acquired in practice by each of the stereo camera 112 and the sensor 113, it is determined that there is an obstruction at the location of this difference.

The temperature information 306 and the humidity information 307 are, respectively, the temperature acquired by the temperature sensor 114 and humidity acquired by the humidity sensor 115, at the grid of location 301. The radio wave information 308 is a value acquired by the radio wave detector 116 at the location 301. This value may be arbitrary, and is, for example, a value of radio wave intensity, or the detected result of whether or not a radio wave of an arbitrary frequency band is present. The sound information 309 is the sound volume reading acquired by the sound collector 117 at the location 301. The illumination information 310 is the illumination reading acquired by the illumination sensor 118 at the location 301. The mirror surface image information 311 is image data acquired as a result of the light probe camera 119 photographing the spherical mirror 121a at the location 301. The wind information 312 is information acquired by the wind sensor 120 at the location 301, and includes at least one of the following: wind speed, airflow, and wind direction. The odor information 313 is information acquired by the odor sensor 122a at the location 301, and includes a reading of at least one of either the absence or presence of particular substances, or the odor intensity thereof.

For the environment information of grids wherein the X and Y coordinates are equal, and only the Z coordinates differ, it is preferable, at locations with equal X and Y coordinates, that the environment information acquirer 123 of the transfer robot 100 controls the height and angle of the camera platform 103, and thereby acquires environment information for each of the different Z coordinates.

As described above, by having environment information for Z coordinates, it is possible to accommodate cases wherein there may be a plurality of locations for placement on one of the trays 170 in the Z direction at the same X and Y coordinates, such as a multi-tiered shelf.

Next, the environment map information 143b, an example of which is shown in FIG. 4, will be described. Primarily, information relating to the trays 170 is stored as the environment map information 143b.

In FIG. 4, the environment map information 143b contains a plurality of records. These records respectively indicate information related to each tray 170. Each record includes a tray ID 401, mark information 402, a short-range communication tag ID 403, a long-range communication tag ID 404, etc. The tray ID 401, mark information 402, short-range communication tag ID 403, and long-range communication tag ID 404, etc. of each record are mutually associated with each other.

The tray ID 401 is identification information for a tray 170.

The mark information 402 is information indicating all of the characteristics of the identification area 221 attached to the tray 170 with the corresponding tray ID 401. In other words, the mark information 402 is information related to either colors or shapes, or a combination thereof, of each of the identification areas 221. In the present embodiment, as described above, since a mark 202 is attached to all sides of one tray 170, five sets of mark information are included in one record. As described above, placing an object or taking an object is possible only from one side of one tray 170. Thus, the first information (FIG. 4; left end) stored in each mark information 402 is information related to the identification area 221 attached to the side for which placing an object and taking an object are possible.

The short-range communication tag ID 403 is a tag ID that contains an RFID tag 211 attached to the tray 170 with corresponding tray ID 401. The long-range communication tag ID 404 is a tag ID that contains an RFID tag 212 attached to the tray 170 with corresponding tray ID 401.

As described above, in the present embodiment, five marks 202 are applied to a single tray 170, and an RFID tag 211 and an RFID tag 212 are affixed on each mark 202. Each of the short-range communication tag ID 403 and the long-range communication tag ID 404 comprises five tag IDs.

Next, an example of the operation of the transfer robot 100 will be described.

First, an example operation, from the point when the transfer robot 100 is activated to the point when an unloading is finished, will be described with reference to FIG. 5.

When the transfer robot 100 is activated and a transfer object is set or otherwise provided to the handling device 101, the transfer destination acquirer 121 acquires the transfer destination of the object provided to the handling device 101 (S501). In order to do so, the transfer destination acquirer 121 displays upon the display or other apparatus of the output device 108, a transfer destination configuration screen to receive the tray ID of one of the trays 170 as the transfer destination. A user, using the input device 107, specifies one of the trays 170 as the transfer destination upon the transfer destination configuration screen. It should be appreciated that this receiving of the transfer destination is arbitrary. The transfer destination need not necessarily be input by directly operating the input device 107 of the transfer robot 100, and may instead by input via the communication device 109. In addition, the transfer destination may also be stored in advance in the storage device 105, etc., of the transfer robot 100.

Hereinafter, the tray 170 that is the transfer destination will be referred to as the transfer destination tray.

Next, the environment map acquirer 122 acquires environment map information 143 (S502). In order to do so, the environment map acquirer 122 sends a data request to the base station 180. The base station 180, according to the data request, sends to the transfer robot 100 environment map information 143 read from its own storage device (not shown in the drawings).

Next, the environment information acquirer 123 acquires information from each of the short-range communication tag reader 110, the long-range communication tag reader 111, the stereo camera 112, the sensor 113, the temperature sensor 114, the humidity sensor 115, radio wave detector 116, the sound collector 117, the illumination sensor 118, the light probe camera 119, the wind sensor 120, and the odor sensor 122*a* (S503). In order to do so, the environment information acquirer 123 controls the respective heights, angles, etc. of the short-range communication tag reader 110 and the long-range communication tag reader 111, by controlling the camera platform 103, for example. Also, the environment information acquirer 123 acquires tag IDs and radio wave intensity readings for the respective coordinate systems of the short-range communication tag reader 110 and the long-range communication tag reader 111. In addition, the environment information acquirer 123 controls the height, angle, etc., of the stereo camera 112, by controlling the camera platform 103 for example, thereby acquiring image data photographed by the stereo camera 112. Furthermore, the environment information acquirer 123 controls the height, angle, etc., of the sensor 113, by controlling the camera platform 103, for example, thereby acquiring the location of a target object in the sensor coordinate system. It should be appreciated that the sensor coordinate system is a coordinate system that takes the sensor 113 (i.e., the transfer robot 100) as its origin. The environment information acquirer 123 controls angles, heights, etc., of the temperature sensor 114 and humidity sensor 115, by controlling the camera platform 103, for example, thereby acquiring temperature and humidity readings. The environment information acquirer 123 controls the height, angle, etc., of the radio wave detector 116, by controlling the camera platform 103 for example, thereby acquiring a radio wave intensity reading, or a reading as to whether or not a radio wave has been detected. The environment information acquirer 123 controls the height, angle, etc., of the sound collector 117, by controlling the camera platform 103 for example, thereby acquiring a sound volume reading. The environment information acquirer 123 controls the height, angle, etc., of the illumination sensor 118, by controlling the camera platform 103 for example, thereby acquiring an illumination reading. The environment information acquirer 123 controls the heights, angles, etc., of the light probe camera 119 and the spherical mirror 121*a*, by controlling the camera platform 103, for example, thereby acquiring image data photographing the spherical mirror 121*a*. The environment information acquirer 123 controls the height, angle, etc., of the wind sensor 120, by controlling the camera platform 103, for example, thereby acquiring at least one of the wind speed, airflow, and wind direction. The environment information acquirer 123 controls the height, angle, etc., of the odor sensor 122*a*, by controlling the camera platform 103, for example, thereby acquiring a reading for the presence or absence of the odor of a particular substance, or the odor intensity thereof.

It should be appreciated that, as described above, for the environment information of grids whose X and Y coordinates are equal and differ only in Z coordinates, the environment information acquirer 123 of the transfer robot 100 may, for locations having equal X and Y coordinates, control the height, angle, etc., of the camera platform 103 to acquire respective environment information for the respective different Z coordinates.

The radio wave range of the long-range communication tag reader 111, as well as an example of the location information of a target object acquired by the sensor 113, will now be described with reference to FIG. 6.

The radio wave range of the long-range communication tag reader 111 is the range 601. It should be appreciated that the radio wave range of the short-range communication tag reader 110 may also be the same as that of the long-range communication tag reader 111, or may be different. Herein, for the sake of brevity, the radio wave communication range of the long-range communication tag reader 111 will be described as containing the radio wave range of the short-range communication tag reader 110 therein.

In addition, by laser scanning the region of ±90° with respect to the forward direction of the transfer robot 100, for example, the sensor 113 acquires the location of a target object. Herein, the sensor 113 acquires the location of a target object, expressed as "XsYs" in the sensor coordinate system 611, for example like that of the target object 621 (bold lined portion). It should be appreciated that the scanning region of the sensor 113 is not limited to the foregoing, and that the angle of the scanning region is also arbitrary.

Figure 5:
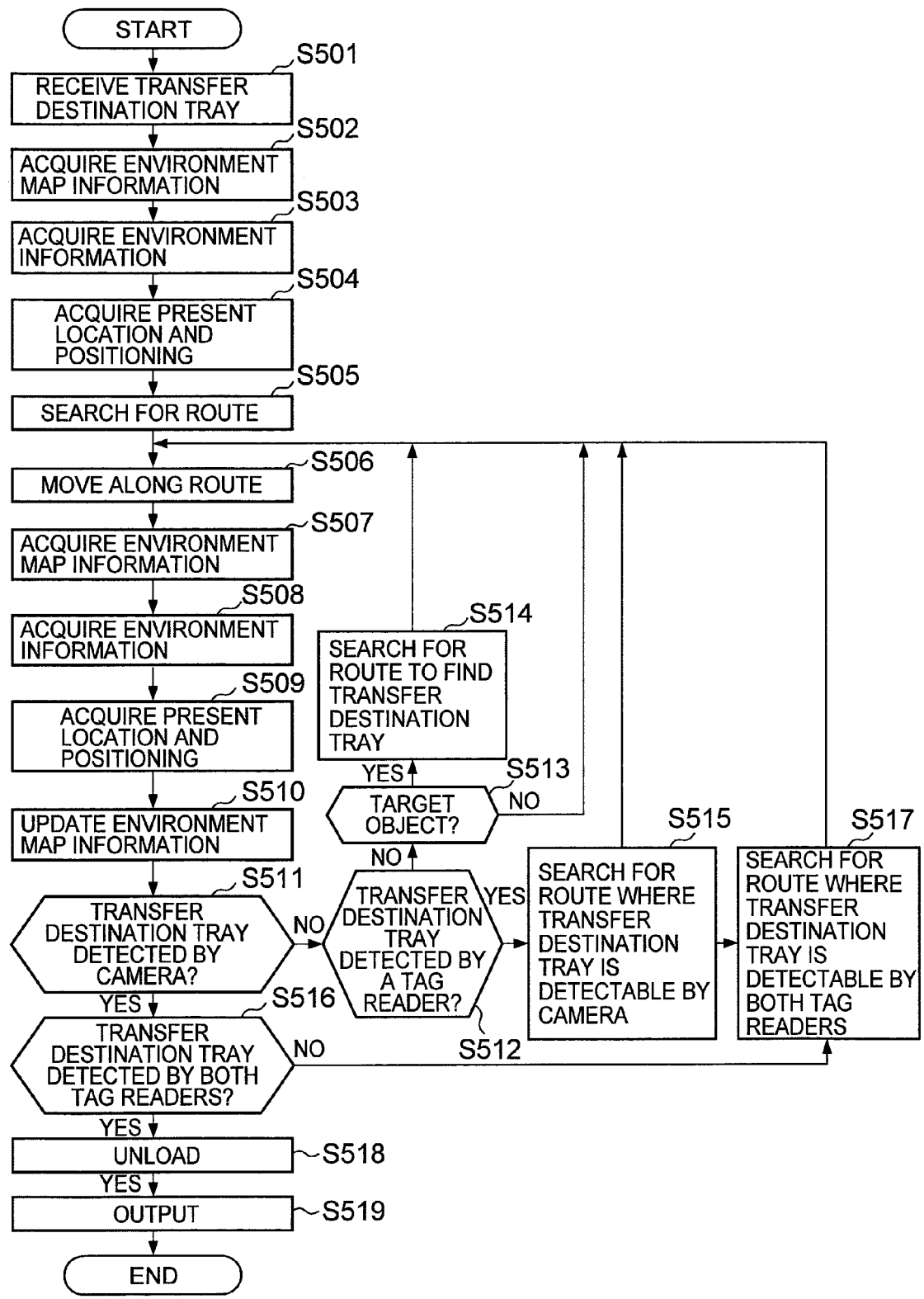
FIG. 5 is a flowchart of the operation of a transfer robot in accordance with the first embodiment.

As shown in FIG. 5, the self-position acquiring unit 124 acquires the location and positioning of the transfer robot 100 (S504). In order to do so, the self-position acquiring unit 124 compares the environment information acquired in step S503 with the sensor data 305 of the environment map information 143*a*. At this point, if, in step S503, information for at least one tray 170 was acquired from at least one device among the short-range communication tag reader 110, the long-range communication tag reader 111, and the stereo camera 112, the self-position acquiring unit 124 extracts from the environment map information 143 the sensor data 305 within a predetermined region that includes the location of this tray 170. From this extracted sensor data 305 and the sensor data acquired by the sensor 113, the self-position acquiring unit 124 acquires the present location and positioning of the transfer robot 100.

The specific process is as follows. For example, in step S503, the tag detector 126 determines whether or not a tag ID has been acquired by at least one of either the short-range communication tag reader 110 or the long-range communication tag reader 111. In cases where the result of this determination is that a tag ID has been acquired, the self-position acquiring unit 124 refers to each of the short-range communication tag IDs 403 and long-range communication tag IDs 404 in each record of the environment map information 143b, and searches for a tag ID that matches the acquired tag ID. Next, the self-position acquiring unit 124 extracts the tray ID 401 of the record that includes the short-range communication tag ID 403 or long-range communication tag ID 404 found by the search. Next, from the environment map information 143a, the self-position acquiring unit 124 searches for the tray ID 303 that matches the extracted tray ID 401 from among the most recent column, and extracts the location 301 for the tray ID 303 found by the search. In cases where plural tag IDs are acquired in step S503, the self-position acquiring unit 124 conducts this process for each tag ID.

On the other hand, the mark detector 125 extracts one set of mark information 402 from each record of the environment map information 143b. Next, the mark detector 125 determines whether or not a region that matches the extracted mark information 402 is included in the image data photographed by the stereo camera 112. As described above, each set of mark information 402 includes information indicating the characteristics of a plurality of identification areas. The mark detector 125 determines whether or not at least one region that matches the information indicating the characteristics of the identification areas is included in the image data photographed by the stereo camera 112. If a matching region is included, the self-position acquiring unit 124 extracts from the environment map information 143b the tray ID 401 of the record included in the extracted mark information 402. Next, from the environment map information 143a, the self-position acquiring unit 124 searches for a tray ID 303 that matches the extracted tray ID 401 from among the most recent column, and extracts the location 301 for the tray ID 303 found by the search. The mark detector 125 conducts this process for each set of mark information 402 in each record of the environment map information 143b.

It should be appreciated that this image data matching determination is equivalent to that of the related art, and is not particularly limited thereto. For example, in the case where the identification area 221 indicates each side of a tray 170 by shapes, determination may be conducted by pattern matching, etc., using each set of mark information 402 as a reference.

From the location 301 extracted in the foregoing process, the self-position acquiring unit 124 acquires a region from which the tag ID is acquirable. This region is arbitrary, and may be for example a region of radius "R" centered on the extracted location 301. This radius "R" is arbitrary, and may be for example be the radio wave range of the RFID tag 212 attached to each of the trays 170, or may be a value decided by the photographic abilities of the stereo camera 112, such as a telephoto function. The self-position acquiring unit 124 extracts from the environment map information 143a the most recent readings from among each obstruction probability 302 for each location 301 within the acquired region. The self-position acquiring unit 124 compares the extracted obstruction probabilities 302 for each location 301 with the sensor data in the sensor coordinate system of the sensor 113 acquired in step S503. In so doing, the self-position acquiring unit 124 acquires the present location and positioning of the transfer robot 100 in the environment coordinate system. The technology herein for acquiring the location and positioning of the transfer robot 100 from the obstruction probability 302 and the sensor data in the sensor coordinate system of the sensor 113 is not particularly limited. For example, this technology may be implemented by pattern matching or other techniques, wherein a target object is taken to be present at the location 301 if the obstruction probability 302 is a value larger than a predetermined value (zero, for example). The positioning of the transfer robot 100 referred to herein is the angle of rotation of the transfer robot 100 in the environment coordinate system.

It should be appreciated that, in cases where the location of the tray 170 is acquired from the information acquired from each of the short-range communication tag reader 110, the long-range communication tag reader 111, and the stereo camera 112, an approximate location of the transfer robot 100 described above may be acquired from the location acquired by any one of the devices above, or by a combination of a plurality thereof.

In addition, for example in cases where the short-range communication tag reader 110, the long-range communication tag reader 111, and the stereo camera 112 all fail to detect the tray 170 in step S503, the following may be conducted. The self-position acquiring unit 124 extracts from the storage device 105 etc. a previously-acquired present location and positioning of the transfer robot 100. The self-position acquiring unit 124 then searches the environment map information 143a for the location 301 that is within a predetermined region included in the previously-acquired present location. The most recent obstruction probability 302 for the location 301 found by the search is then extracted. Next, the self-position acquiring unit 124 compares the obstruction probability 302 for the extracted location 301 with the sensor data in the sensor coordinate system of the sensor 113 that was acquired in S503. Thus, the self-position acquiring unit 124 acquires the present location and positioning of the transfer robot 100 in the environment coordinate system. This technology for acquiring the present location and positioning of the transfer robot 100 is equivalent to that described above.

A specific example of the transfer robot 100 acquiring its present location will now be described with reference to FIG. 7.

Figure 7:
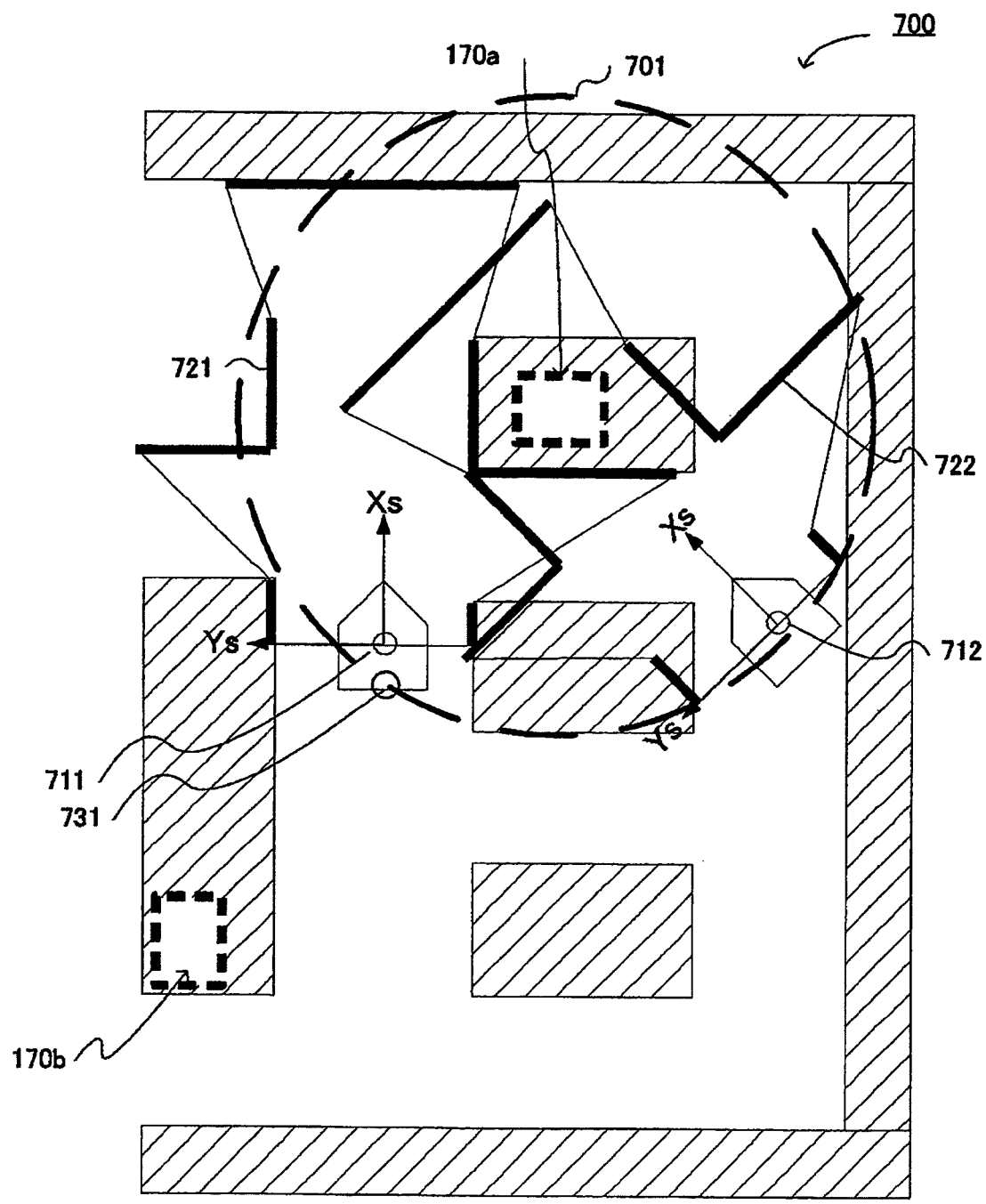
FIG. 7 is an exemplary view illustrating operation whereby the transfer robot acquires its present location and pose, in accordance with the first embodiment.

In FIG. 7, a map 700 is an example of a map wherein the obstruction probability 302 is a value larger than a predetermined value (zero, for example) in the environment map information 143a, and thus a target object is assumed to be present. The transfer robot 100 is located somewhere within the region shown in the map 700. The map 700 includes location information for the trays 170. In the example shown in FIG. 7, when differentiating among the plurality of trays 170 in the following description, reference numbers such as "tray 170a" will appended.

Figure 6:
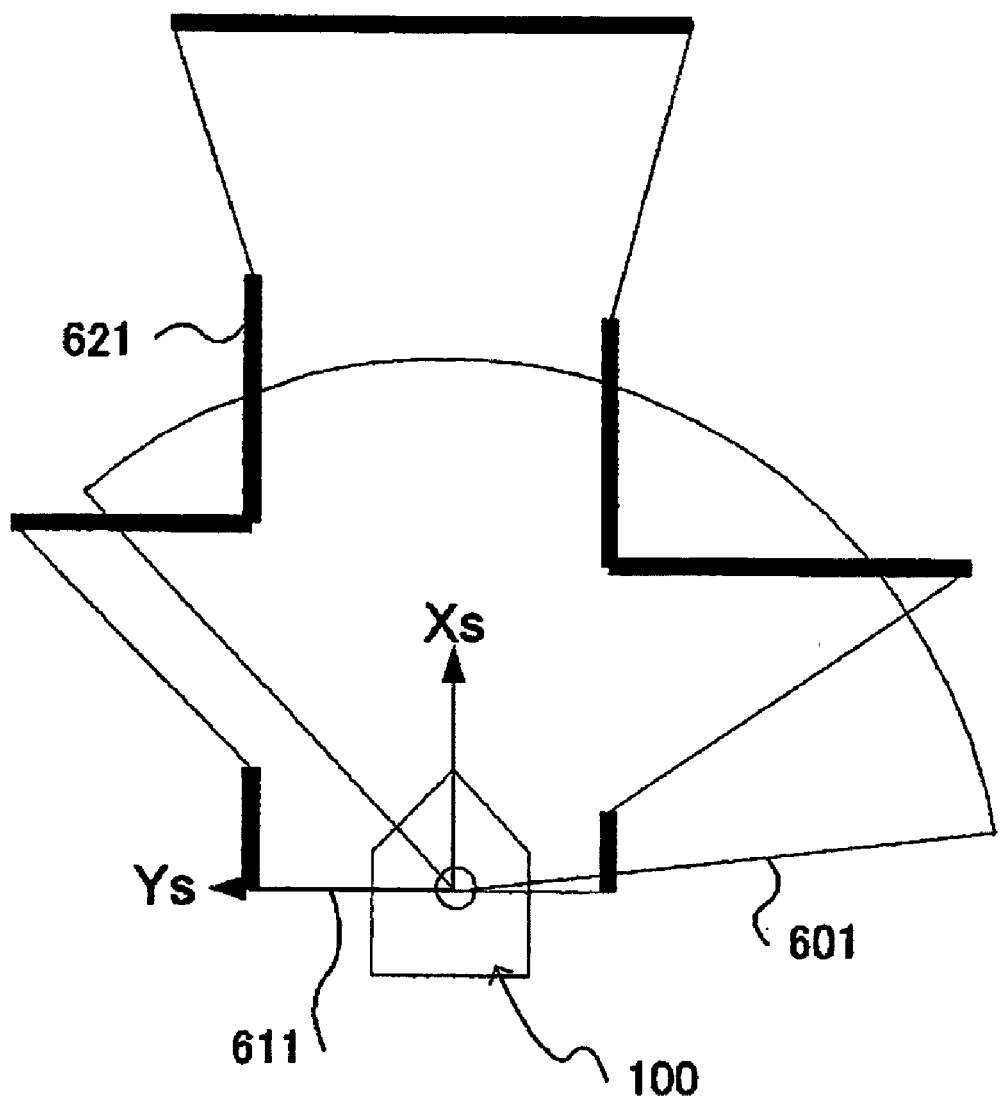
FIG. 6 is a view illustrating radio wave range of a long-range communication tag reader, as well as sensor data acquired by a sensor, in accordance with the first embodiment.

At this point, in step S503, the sensor 113 of the transfer robot 100 is assumed to have acquired data like that of the above example in FIG. 6. In addition, the long-range communication tag reader 111 of the transfer robot 100 is assumed to have acquired the tag ID retained by the RFID tag 212.

In this case, the self-position acquiring unit 124 refers to each long-range communication tag ID 404 in each record of the environment map information 143b, and searches for a tag ID that matches the acquired tag ID. The self-position acquiring unit 124 extracts the tray ID 401 of the record that contains the long-range communication tag ID 404 found by the search. Next, the self-position acquiring unit 124 searches among the most recent tray IDs 303 in the environment map information 143*a* for a tray ID that matches the extracted tray ID 401, and extracts the location 301 of the corresponding tray ID 303. In the example shown in FIG. 7, the extracted location 301 corresponds to the location of a tray 170*a*. From the extracted location 301, the self-position acquiring unit 124 acquires a region where this tag ID is acquirable. In the example shown in FIG. 7, a region 701 is taken to be the region where the tag ID retained by the RFID tag 212 attached to the tray 170*a* is acquirable. In this case, the self-position acquiring unit 124 extracts from the environment map information 143*a* the most recent obstruction probability 302 for the location 301 within the region 701. The self-position acquiring unit 124 then acquires a reading of the difference between the geometrical shape of the target object 621 as shown by an example in FIG. 6, and the target object displayed using the extracted obstruction probability 302 and the location 301 thereof. The self-position acquiring unit 124 then acquires the location and positioning of the origin of the sensor coordinate system in the environment coordinate system by finding where this difference is minimized. Using this location and positioning of the origin, the present location and positioning of the transfer robot 100 is acquired. A specific example will now be described for cases wherein, in the example shown in FIG. 7, the self-position acquiring unit 124 assumes that the location and positioning of the origin of the sensor coordinate system is in a location 711, or alternatively, a location 712. In this case, the self-position acquiring unit 124 acquires a reading of the difference between the geometrical shape of the target object 621 (the shape 721 in FIG. 7) and the map 700 (the target object displayed using the obstruction probability 302 and the location 301 thereof), for the case assuming that the location and positioning of the origin of the sensor coordinate system is the location 711. In addition, the self-position acquiring unit 124 acquires a reading of the difference between the geometrical shape of the target object 621 (the shape 722 in FIG. 7) and the map 700, for the case assuming that the location and positioning of the origin of the sensor coordinate system is the location 712. The self-position acquiring unit 124 selects the location and positioning of the origin of the sensor coordinate system that exhibits the smallest acquired difference reading. In this case, the difference reading for the case assuming that the location and positioning of the origin of the sensor coordinate system is the location 711 is the smallest. Thus, the self-position acquiring unit 124 determines that the location and positioning of the transfer robot 100 is in a location 731, derived from the location 711 and positioning of the origin of the sensor coordinate system.

In a case shown in FIG. 7, the transfer robot 100 is able to acquire the tag ID retained by the RFID tag 212 attached to the tray 170. However, in cases where the tray 170 is not at this location, the self-position acquiring unit 124 conducts a search within the region acquired from the previously-acquired present location and positioning, as described above. In this process, the region of the location and positioning of the origin of the sensor coordinate system is determined based on the previously-acquired present location, as opposed to the above-described predetermined region based on the detected tray 170. Since only this process is different, and other processes are equivalent to those described in the foregoing, further details are omitted herein for the sake of brevity.

In this way, since a region with a high probability that the transfer robot 100 is present therein is searched from an acquired tag ID, the estimation of the self-location of the transfer robot 100 can be made faster. In addition, even in the case where a tag ID cannot be acquired, since a region in the vicinity of the previously-acquired present location is searched, the estimation of the self-location of the transfer robot 100 can be made faster.

It should be appreciated that there are also cases wherein one of the trays 170 is moved, etc., and thus the actual location of the tray 170 and the location information of the tray 170 according to the environment map information 143 do not match. In cases such as this, even if the tray 170 is detected by at least one of the short-range communication tag reader 110, the long-range communication tag reader 111, and the stereo camera 112 in step S503, it becomes impossible to acquire an approximate location of the transfer robot 100 from the region wherein the tray 170 is detectable. In order to cope with such cases, the self-position acquiring unit 124 may for example determine that the actual location of the tray 170 and the location information of the tray 170 according to the environment map information 143 do not match in the case where each of the distances to the plurality of locations 301 extracted in the above-described process meet or exceed a predetermined distance (for example, a distance greater than or equal to the radio wave range of the long-range communication tag, or a distance greater than or equal to the photographic ability of the stereo camera 112). In addition, the self-position acquiring unit 124 may determine that the actual location of the tray 170 and the location information of the tray 170 according to the environment map information 143 do not match in cases where, for example, the matching ratio between the target object indicated by the obstruction probability 302 and the location 301 thereof extracted in the above process, and the data of the sensor 113 acquired in step S503, is at or below a predetermined value, and thus the acquisition of the present location and positioning of the transfer robot 100 in the environment coordinate system is impossible. In cases where it is determined that the actual location of the tray 170 and the location information of the tray 170 according to the environment map information 143 do not match, the self-position acquiring unit 124 may perform the following. In a process equivalent to the above-described, the self-position acquiring unit 124 extracts the most recent reading from among the previously-acquired obstruction probabilities 302 at location 301 in the vicinity of the previously-acquired present location. The target object, indicated by the extracted obstruction probability 302 and the location 301 of this obstruction probability 302, is compared with the data of the sensor 113 acquired in step S503, thereby acquiring the present location and positioning of the transfer robot 100 in the environment coordinate system.

In FIG. 5, the route searching section 129 searches for a route for the transfer robot 100 by the transfer destination tray acquired in the above step S501, and the present location and positioning of the transfer robot 100 acquired in the above step S504 (S505). The technology by which the route searching section 129 searches is not particularly limited, and may for example acquire a route by the shortest path algorithm. In this case, it is preferable for the route searching section 129 to conduct the following. The route searching section 129 refers to the most recent reading among the obstruction probabilities 302 for each location 301 in the environment map information 143*a*, extracts a region for which the value of the obstruction probability 302 is at or below a predetermined value, and then solves for the route within the extracted region wherein the distance moved from the present location of the transfer robot 100 to the transfer destination tray is the shortest.

Next, the movement controller 130 controls the driving device 102 so as to move along the route found by the search in step S505 (S506). The control technology of this driving device 102 is not particularly limited, and since it is equivalent to that of the related art, further description thereof is herein omitted for the sake of brevity.

After a predetermined time has passed since the process in step S506 has commenced, or alternatively, after having moved a predetermined distance, etc., the environment map information acquirer 122 acquires environment map information 143 (S507). This process is equivalent to that of step S502.

Next, the environment information acquirer 123 acquires information from the short-range communication tag reader 110, the long-range communication tag reader 111, the stereo camera 112, the sensor 113, the temperature sensor 114, the humidity sensor 115, the radio wave detector 116, the sound collector 117, the illumination sensor 118, the light probe camera 119, the wind sensor 120, and the odor sensor 122a (S508). This process is equivalent to that of step S503.

Next, the self-position acquiring unit 124 acquires the location and positioning of the transfer robot 100 (S509). This process is equivalent to that of step S504.

Next, the environment information updater 128 updates the environment map information 143 (S510). In order to do so, the environment information updater 128 may for example update the environment information, readings for the presence or absence of obstructions, locations of the trays 170, etc., and send the updated environment map information 143 to the base station 180.

In order to update the environment information, the environment information updater 128 may for example store the respective information acquired in step S508 from the temperature sensor 114, the humidity sensor 115, the radio wave detector 116, the sound collector 117, the illumination sensor 118, the light probe camera 119, the wind sensor 120, and the odor sensor 122a, as the most recent temperature information 306, humidity information 307, radio wave information 308, sound information 309, illumination information 310, mirror surface image information 311, wind information 312, and odor information 313, etc., for the location 301 in the environment map information 143a shown by the example in FIG. 3 that matches the location acquired in step S508.

In addition, in order to update the reading for the presence or absence of obstructions, the environment information updater 128 may for example acquire a reading of the difference between the data acquired by the sensor 113 in step S508 and the most recent sensor data 305 in the environment map information 143a. In cases where this difference reading is equal to or greater than a predetermined value, it is determined that an obstruction is present in the place where the difference exists. This is updated as the most recent obstruction probability 302 for the location 301 in the environment map information 143a shown by the example in FIG. 3 that matches the location acquired in step S508. The specific operation example will be described with reference to FIG. 8.

Figure 8:
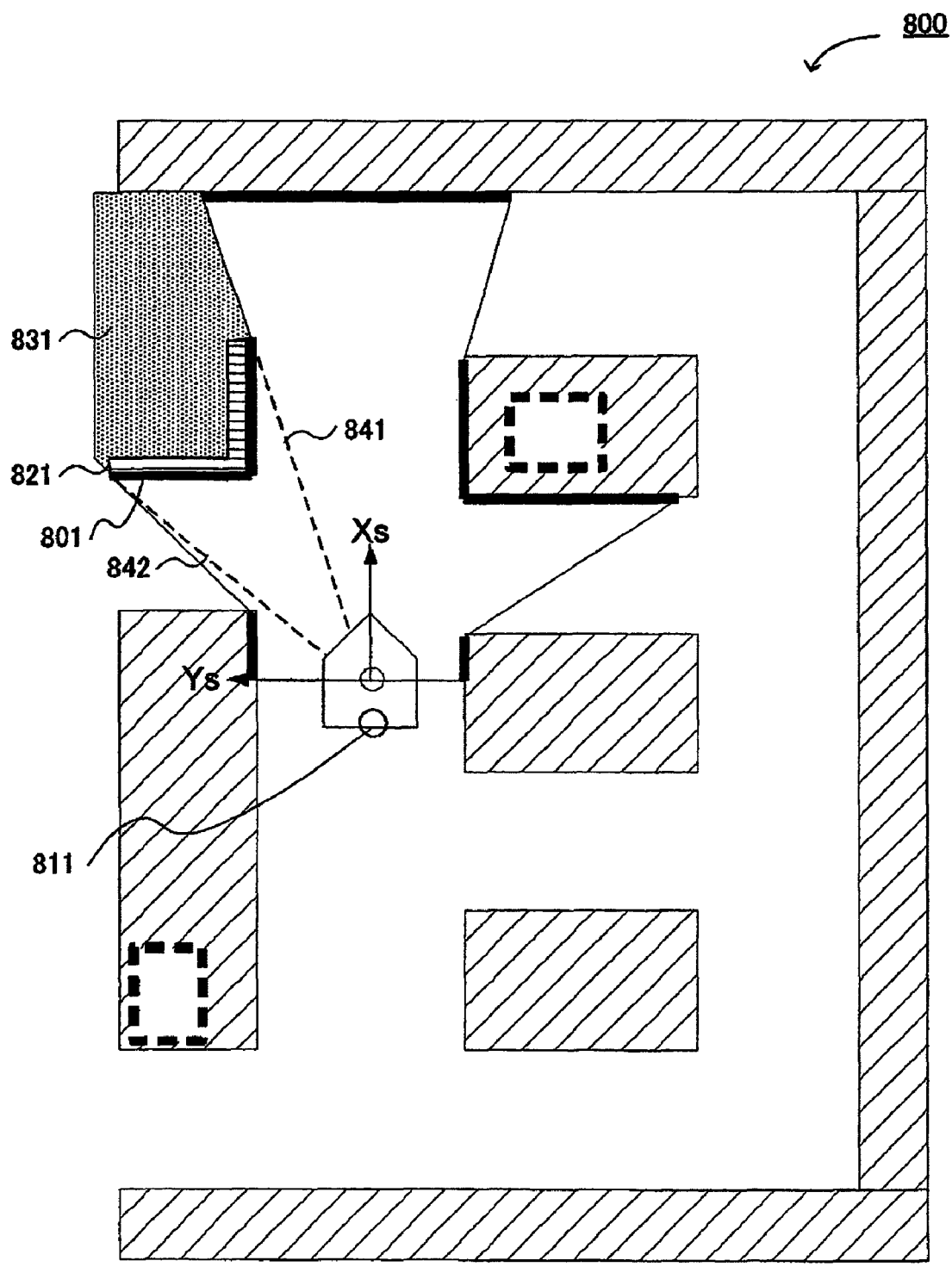
FIG. 8 is an exemplary view illustrating operation whereby an obstruction is detected, in accordance with the first embodiment.

In FIG. 8, the transfer robot 100 is located somewhere within the region indicated by the map 800. A target object 801 (bold portion) is the data acquired by the sensor 113 in step S508. In step S509, it is determined that the transfer robot 100 is located and positioned at a location 811.

The environment information updater 128 acquires a reading of the difference between the target object 801 and the map 800. In this case, the environment information updater 128 acquires a difference 821. The environment information updater 128 determines this difference 821 to be an obstruction, and acquires the location of the difference 821. The environment information updater 128 updates the most recent record among the obstruction probabilities 302 at the location 301 in the environment map information 143a that matches the acquired location.

In the present case, there is a region 831 behind the difference 821 with respect to the sensor 113 of the transfer robot 100 of location and positioning corresponding to the location 811, and therefore the presence or absence of obstructions cannot be confirmed. Consequently, the environment information updater 128 may also insert, into the environment map information 143a information, the effect that the presence or absence of obstructions cannot be confirmed. In this case, the environment information updater 128 specifies the region wherein the presence or absence of obstructions cannot be confirmed. In order to specify this region, the environment information updater 128 may, in the case of FIG. 8 for example, create line segments 841 and 842 (shown as broken lines) that pass through the present location and positioning of the transfer robot 100 in the sensor coordinate system and the edges of the difference 821. The environment information updater 128 specifies the region from the difference 821, the line segments 841 and 842, as well as the sensor data 305 of the environment map information 143a. The environment information updater 128 then adds information indicating that the presence or absence of obstructions cannot be confirmed to the locations 301 in the environment map information 143a that match each grid within the specified region. This information herein is arbitrary, may for example be realized by appending a flag indicating that the presence or absence of obstructions cannot be confirmed, or alternatively, by updating the obstruction probability 302 for this location.

In addition, in order to update the location of the trays 170, at first, it is determined whether or not each of the mark detector 125 and the tag detectors 126 has detected at least one of the trays 170 from the environment information acquired in step S508. This determination process is equivalent to the process described in the above step S504. As a result of this process, it is determined whether or not at least one of the trays 170 has been detected, and in addition the tray ID of the at least one detected tray 170 is acquired. In cases where at least one of the trays 170 has been detected, the tray location estimator 127 acquires the location of the at least one detected tray 170. Next, the environment information updater 128 updates the environment map information 143a with the tray location from the results acquired by the tray location estimator 127.

First, an example operation of the tray location estimator 127 acquiring the location of one of the trays 170 will be described. The tray location estimator 127 may for example acquire the location of one of the detected trays 170 from the radio wave intensity of the RFID tag 211 acquired by the short-range communication tag reader 110. In other words, the tray location estimator 127 determines that one of the trays 170 is present at the spot where the radio wave intensity of the RFID tag 211 is the most intensive. In addition, the tray location estimator 127 may for example acquire the location of one of the detected trays 170 from the radio wave intensity of the RFID tag 212 acquired by the long-range communication tag reader 111. In other words, the tray location estimator 127 determines that one of the trays 170 is present at the spot where the radio wave intensity of the RFID tag 212 is the most intensive. In order to do so, the tray location estimator 127 may for example designate a direction "D1" along which one of the trays 170 is present, being the direction along which each of the radio wave intensity of the RFID tag 211 acquired by the short-range communication tag reader 110, and the radio wave intensity of the RFID tag 212 acquired by the long-range communication tag reader 111 become the most intensive. In addition, the tray location estimator 127 acquires a value for a distance "R1" from its present location to the tray 170 from the radio wave intensity of the RFID tag 211 and the RFID tag 212. The tray location estimator 127 designates the point that is both along the line segment "D1" where the transfer destination tray is present, and separated from the present location of the transfer robot 100 by a distance "R1", as the location of the tray 170.

In addition, the tray location estimator 127 acquires the location of a detected tray 170 based on in which location mark information 402 in the image data acquired by the stereo camera 112 is included.

An example operation for specifying a location of the transfer destination tray from image data will now be described with reference to FIG. 9A.

In FIG. 9A, an image 900 is image data acquired by the stereo camera 112 in cases where the location and positioning of the transfer robot 100 is the location 811, as shown in the example in FIG. 8. At this point, it is assumed that the mark detector 125 has detected the identification area 221 in the image 900 for the location 901. Since a region 902 of the image 900 is included in the identification area 221, the tray location estimator 127 refers to a table, etc., (not shown in the drawings), and acquires the location corresponding to this region. This table (not shown in the drawings) includes, for example, locations in the environment coordinate system, regions dividing the image data photographed by the stereo camera 112 at these locations, and information indicating which locations in the environment coordinate system correspond to each of these regions. Supposing, for example, that the identification area 221 is detected in a region 903 of the image 900, the tray location estimator 127 will determine that the vicinity of the difference 821 in the map 800, shown by way of the example in FIG. 8, is the location of the tray 170 to which is attached this identification area 221.

However, at this point it is conceivable that the distance between a plurality of trays 170 is short, that the RFID tags 212 of this plurality of trays 170 are acquired simultaneously, and therefore that the radio wave intensities of the respective RFID tags 212 for the trays 170 cannot be identified. In this case, the transfer robot 100 may approach each of the plurality of trays 170, read the RFID tag 211 of the tray 170, and thereby identify the tray 170. A specified example of the above will now be described with reference to FIG. 9B.

In the example of FIG. 9B, when differentiating among the plurality of trays 170, as well as the respective tag IDs attached to each of the trays 170, reference numbers such as for example "tray 170a" will used in the description thereof. In addition, like the description with reference to FIG. 2, an RFID tag 211 and an RFID tag 212 are affixed to each mark 202 in a single tray 170. In the example of FIG. 9B, for the sake of brevity, each of the trays 170a and 170b has one RFID tag 211 and one RFID tag 212 attached thereto.

In FIG. 9B, each of an RFID tag 211a and an RFID tag 212a is affixed to a tray 170a. The radio wave range of the RFID tag 211a is a circular region 911a. The radio wave range of the RFID tag 212a is a circular region 912a.

Meanwhile, each of an RFID tag 211b and an RFID tag 212b is affixed to a tray 170b. The radio wave range of the RFID tag 211b is a circular region 911b. The radio wave range of the RFID tag 212b is a circular region 912b.

In the example of FIG. 9B, the region 912a and the region 912b overlap. This overlapping region is referred to as a region 921. Thus, when the transfer robot 100 is located in the region 921, it reads both the long-range communication tag ID of the RFID tag 212a and the long-range communication tag ID of the RFID tag 212b, and therefore may have difficulties differentiating the RFID tag 212a and the RFID tag 212b using radio wave intensity. In this case, the tray location estimator 127 of the transfer robot 100 acquires the direction for which the radio wave intensity is more intensive, without differentiating between the RFID tag 212a and the RFID tag 212b. The trays 170 are present in this direction for which the radio wave intensity is more intensive. Next, the movement controller 130 controls the driving device 102 so as to move into the region allowing communication with the RFID tag 211 of either one of the trays 170. After moving, the short-range communication tag reader 110 communicates with the RFID tag 211 and acquires its tag ID. From the acquired tag ID, the tray ID of this tray 170 is acquired, by a process equivalent to the process described in the above step S504. In addition, the tray location estimator 127 moves to the region allowing communication with the RFID tag 211 of the other tray 170, and conducts a process equivalent to the above.

It should be appreciated that in the case where the location of one of the trays 170 is acquired from the information acquired respectively by the short-range communication tag reader 110, the long-range communication tag reader 111, and the stereo camera 112, the environment map information 143 may be updated with the location acquired by any one of the above, or alternatively, by a combination of a plurality thereof.

Next, an operational example of the environment information updater 128 updating a tray location in the environment map information 143a from the result acquired by the tray location estimator 127 will be described. The environment information updater 128 refers to the most recent record among each tray ID 303 in the environment map information 143a, searches for a tray ID that matches the tray ID of the tray 170 detected in the above-described process, and extracts the location 301 of this tray ID 303. Next, the environment information updater 128 determines whether or not the extracted location 301 matches the location of the tray 170 acquired in the above-described process. This determination of matching locations may be conducted based on an exact match, or based on a match within a predetermined range. In the case where this determination results in a match, the environment information updater 128 does not update the location of the tray 170. In addition, in the case where this determination does not result in a match, the environment information updater 128 deletes the most recent tray ID 303 of the location 301 in the environment map information 143a, wherein the tray ID 303 is extracted in the above-described process and matches the tray ID of the detected tray 170. Furthermore, the environment information updater 128 searches among the locations 301 in the environment map information 143a for a location that matches the location acquired in the above-described process. Next, the environment information updater 128 adds the tray ID of the tray 170 detected in the above-described process as the most recent value of the tray ID 303 for the location 301 found by the search.

The environment information transmitter 133 sends the environment map information 143 updated in the above-described process to the base station 180. The base station 180 stores the received environment map information 143 in a storage device (not shown in the drawings).

In FIG. 5, the mark detector 125 determines whether or not the transfer destination tray has been detected by the stereo camera 112 (S511). In order to do so, the mark detector 125 may, for example, determine whether or not at least one of the trays 170 is detected from the image data photographed by the stereo camera 112 in step S510. In cases where the result of this determination is such that at least one of the trays 170 is detected, the mark detector 125 determines whether or not the tray ID of this tray 170 matches the tray ID of the transfer destination tray that was received in step S501.

In cases where the result of the determination in step S511 is such that the transfer destination tray is not detected by the stereo camera 112, the tag detector 126 determines whether or not the transfer destination tray is detected by at least one of the short-range communication tag reader 110 and the long-range communication tag reader 111 (S512). In order to do so, the tag detector 126 may for example determine whether or not at least one of the trays 170 is detected by at least one the short-range communication tag reader 110 and the long-range communication tag reader 111. In cases where the result of this determination is such that at least one of the trays 170 is detected, the tag detector 126 determines whether or not the tray ID of this tray 170 matches the tray ID of the transfer destination tray received in step S501.

In cases where the result of the determination in step S512 is such that the transfer destination tray is not detected by either the short-range communication tag reader 110 or the long-range communication tag reader 111, the self-position acquiring unit 124 determines whether or not the present location acquired in step S509 matches the target location (S513). Locations may be determined to be matching for an exact match only, or alternatively, for a match within a predetermined distance.

In cases where the result of the determination in step S513 is such that the present location does not match the target location, the process proceeds to the above-described step S506.

In cases where the result of the determination in step S513 is such that the present location matches the target location, the route searching section 129 searches for a route for the transfer destination tray (S514). This route search is not particularly limited, and may for example be realized by searching, giving priority to the locations of past transfer destination trays. In order to do so, the route searching section 129 may, for example, refer to the environment map information 143a, extract the second most recent location from among the locations 301 for the tray ID 303 that matches the tray ID of the transfer destination tray, and search for a route from the present location of the transfer robot 100 to the extracted location 301. In addition, the route searching section 129 may also, for example, extract, for each time within a predetermined time period, the location 301 for the tray ID 303 that matches the tray ID of the transfer destination tray. The route searching section 129 then counts the identical locations 301, and may search for routes from the present location of the transfer robot 100 to the location 301 whose count value is the largest. In addition, the route searching section 129 may also, for example, extract, for each time within a predetermined time period, the location 301 for the tray ID 303 that matches the tray ID of the transfer destination tray. The route searching section 129 then counts the identical locations 301, and may search for routes from the present location of the transfer robot 100 to the respective locations 301 in descending order of count value.

On the other hand, in cases where the result of the determination of the above step S512 is such that the transfer destination tray is detected by at least one of the short-range communication tag reader 110 and the long-range communication tag reader 111, the route searching section 129 searches for a route whereby the transfer destination tray will be detectable by the stereo camera 112 (S515). In other words, in this case, since it is conceivable that an obstruction of some sort may be present between the transfer destination tray and the transfer robot 100, the route searching section 129 searches for a route that approaches the transfer destination tray while avoiding this obstruction. This process is not particularly limited, and the route searching section 129 may for example search for a route for moving to the respective locations within a predetermined region centered on the location of the transfer destination tray. This region is arbitrary, and may for example be decided by the radio wave range of the long-range communication tag or the short-range communication tag. After this process in step S515, the process moves to the above-described step S506. By repeating the above process once more, it is determined once more whether or not the transfer destination tray is detectable by the stereo camera 112, and therefore new routes are searched for until the transfer destination tray becomes detectable by the stereo camera 112.

On the other hand, in cases where the result of the determination in step S511 is such that the transfer destination tray has been detected by the stereo camera 112, the tag detector 126 determines whether or not the transfer destination tray has been detected by both the short-range communication tag reader 110 and the long-range communication tag reader 111 (S516). In order to do so, the tag detector 126 may for example determine whether or not both the short-range communication tag reader 110 and the long-range communication tag reader 111 have detected at least one identical tray 170 in the above step S510. If the result of this determination is such that a tray 170 has been detected, the tag detector 126 determines whether or not the tray ID of this tray 170 matches the tray ID of the transfer destination tray received in the above step S501.

In cases where the result of the determination in step S516 is such that the transfer destination tray has not been detected by both the short-range communication tag reader 110 and the long-range communication tag reader 111, the route searching section 129 searches for a route whereby the transfer destination tray will be detectable by both the short-range communication tag reader 110 and the long-range communication tag reader 111 (S517). This process is not particularly limited, and the route searching section 129 may for example acquire a location whereat the respective radio wave intensity of the RFID tag 211 and the RFID tag 212 attached to the transfer destination tray becomes more intensive, and then search for a route from the present location of the transfer robot 100 to the acquired location. After this process in step S517, the process moves to the above step S506. By repeating the above process once more, it is determined once more whether or not the transfer destination tray is detectable by both the short-range communication tag reader 110 and the long-range communication tag reader 111, and therefore new routes are searched for until the transfer destination tray becomes detectable by both the short-range communication tag reader 110 and the long-range communication tag reader 111.

In this way, by installing a short-range communication tag onto a tray, the location of the tray can be more accurately specified. In addition, by confirming the tag ID retained by the short-range communication tag, the transfer to a tray different from the original transfer destination can be prevented, even in cases where a tray different from the transfer destination is placed in the location where the tray designated as the transfer destination should have been placed.

Returning to FIG. 5, in cases where the result of the determination of step S516 is such that the transfer destination tray is detected by both the short-range communication tag reader 110 and the long-range communication tag reader 111, the process by which the package held by the handling device 101 is lowered into the transfer destination tray is conducted (S518).

First, the unload determining unit 131 determines whether or not the unloading to the transfer destination tray is possible at the present location. In order to do so, the unload determining unit 131 determines whether or not the identification area 221 included in the image data photographed by the stereo camera 112 corresponds to the unloadable side. As described above, in the present embodiment, the mark attached to the unloadable side is stored in the leftmost column of the mark information 402 in the environment map information 143b, as shown by the example in FIG. 4. Consequently, the unload determining unit 131 searches from the environment map information 143b for a record that includes the tray ID 401 that matches the tray ID of the transfer destination tray. The leftmost mark stored among the mark information 402 included in this record is then extracted. The unload determining unit 131 determines whether or not unloading is possible based on whether or not a mark that matches the extracted mark information 402 is contained within a predetermined region of the image data photographed by the stereo camera 112. In cases where the result of this determination is such that the unloadable side of the transfer destination tray is included, the unload determining unit 131 determines that unloading to the transfer destination tray is possible. In cases where the result of this determination is such that unloading to the transfer destination tray is not possible, the unload determining unit 131 acquires a location whereat unloading is inferred to be possible. The process here for acquiring a location whereat unloading is inferred to be possible may be arbitrarily configured, and the unload determining unit 131 may for example move to each location within a predetermined region centered on the location of the transfer destination tray. At these respective locations, the unload determining unit 131 may determine whether or not unloading is possible as described above, and repeat this process until it is determined that unloading is possible. This predetermined region is not particularly limited, and may for example be a region decided by the abilities, such as arm length or another attribute of the handling device 101.

In cases where unloading is determined to be possible as a result of the above determination, the handling controller 132 controls the handling device 101 to conduct unloading. This unloading process is not particularly limited, and depends on the configuration of the handling device 101. The unloading process is equivalent to that of the related art.

Next, the result output section 134 outputs results to the output device 108, or alternatively, another device (not shown in the drawings) (S519). Specifically, the result output section 134 outputs information such as the tray locations or obstructions for the environment map information 143 updated by the above-described process, the present location of the transfer robot 100, movement routes, etc.

An example of the way in which the result output section 134 displays results to the output device 108 or other displays will now be described with reference to FIG. 10.

Figure 10:
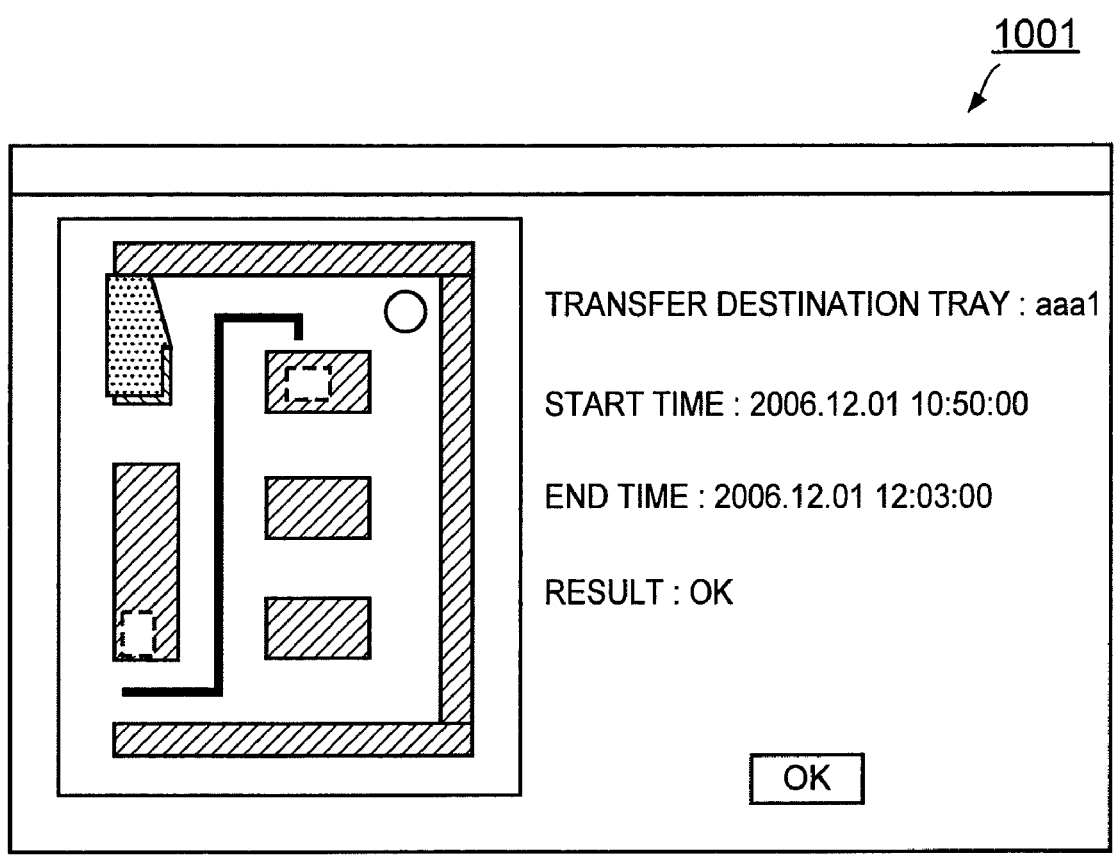
FIG. 10 is an exemplary view showing a screen that outputs results, in accordance with the first embodiment.

FIG. 10 shows an image 1001 that includes a map image of the movement region of the transfer robot 100. As shown by the example in FIG. 10, the result output section 134 creates data locating the trays 170, obstructions, routes of the transfer robot 100, the present location of the transfer robot 100, etc. on the map image, wherein those data were detected during the present movement. Then these data are output to the output device 108 or another display.

As a result of the above technology, by detecting the respective identification areas (marks) as well as the tags of the trays 170, the transfer destination tray can be detected, even in cases where the location thereof is different from that of the environment map information stored in advance. In addition, by detecting the respective identification areas (marks) as well as the tags of the trays 170, it becomes possible to acquire the location and positioning of the transfer destination tray, and by acquiring the location and positioning for the transfer robot 100 to unload an object, it is possible to automatically conduct unloading.

The application of the above-described technology is arbitrary, and it is conceivable for use in, for example, transfer of materials in places such as industrial plants, or for delivery of postal matter in places such as offices.

For example, in an industrial plant, the above-described marks 202 may be affixed to racks, with the components for use in various processes, or alternatively, may be affixed to the respective shelves of the racks. In this case, when the transfer robot 100 arrives at the rack that is the target location, the transfer robot 100 may place the component that had been holding upon that rack, or alternatively, upon a shelf of that rack. At this point, if the component can fit into a returnable container or other container, the transfer robot 100 may, after lowering the target container from the target location (i.e. the rack), place the container the transfer robot 100 itself had transferred, onto the rack, and furthermore, transfer the lowered container to a predetermined location.

In addition, for example, in an office or similar setting, the above-described marks 202 may be affixed to individual trays for receiving postal matter for individual personnel. In this case, when the transfer robot 100 arrives at the tray that is the target location, the transfer robot 100 may place the postal matter that it has been holding into that tray.

In addition, the transfer robot 100 is also able to acquire, while moving, information such as temperatures, humidity, readings of the presence or absence of radio wave detection or radio wave intensity, sound volume, illumination readings, image data of the photographed spherical mirror, air flow or wind direction readings, readings of the presence or absence of an odor of particular substances, odor intensity, etc. It is possible to utilize the acquired temperature, humidity, air volume or wind direction, etc., as data for acquiring suitable installation locations for air conditioners, dehumidifiers and humidifiers, for example. As a result, it is possible to improve the efficiency of air conditioning, dehumidification, humidification, etc. In addition, it is possible to utilize the acquired readings of the presence or absence of radio wave detection or radio wave intensity as data for acquiring suitable installation locations for devices such as wireless LAN repeaters, for example. In addition, it is possible to utilize the acquired volume readings as data for acquiring suitable installation locations for speakers, microphones, etc., for example. It is possible to utilize the acquired illumination readings as data for acquiring suitable installation locations for lighting, for example. From the acquired image data of the photographed spherical mirror, it is possible to generate a light probe image, for example. From this light probe image, it is possible to generate a composite image. It is possible to utilize the acquired readings for the presence or absence of the odor of particular substances or odor intensity readings as data for acquiring suitable installation locations for air purifiers, air conditioners, etc. In addition, using the acquired readings for the presence or absence of the odor of particular substances or odor intensity readings, it is possible to detect abnormal conditions such as gas leaks.

In addition, the environment map information 143 acquired by the transfer robot 100 may also be outputted to the output device 108 of the transfer robot 100, or alternatively, to an information terminal (not shown in the drawings) connected to the communications network 190 or by other means. As a result, it may be configured such that a user can refer to information such as the locations of the trays 170, image data or sensor data for arbitrary points upon a map, temperatures, humidity, readings for the presence or absence of radio wave detection or radio wave intensity, sound volume, illumination readings, image data of the photographed spherical mirror, air volume or wind direction readings, readings for the presence or absence of the odor of particular substances, odor intensity readings, etc. By referring to this environment information, the user is for example able to do the following: use the image data to confirm the conditions at points where there is a high probability of an obstruction or a detected abnormality, or confirm conditions at arbitrary points upon the map, such as environment conditions like temperature and humidity where a tray is placed.

Second Embodiment

In the foregoing first embodiment, a single transfer robot 100 performed actions such as transferring objects. In a second embodiment to be hereinafter described, a plurality of transfer robots 100 transfer respective objects, and each transfer robot 100 mutually shares environment map information 143.

For portions of the second embodiment that are identical to those of the foregoing first embodiment, to be hereinafter described, identical reference numbers will be used in the description thereof.

First, a configuration example of the second embodiment will be described with reference to FIG. 11.

Figure 11:
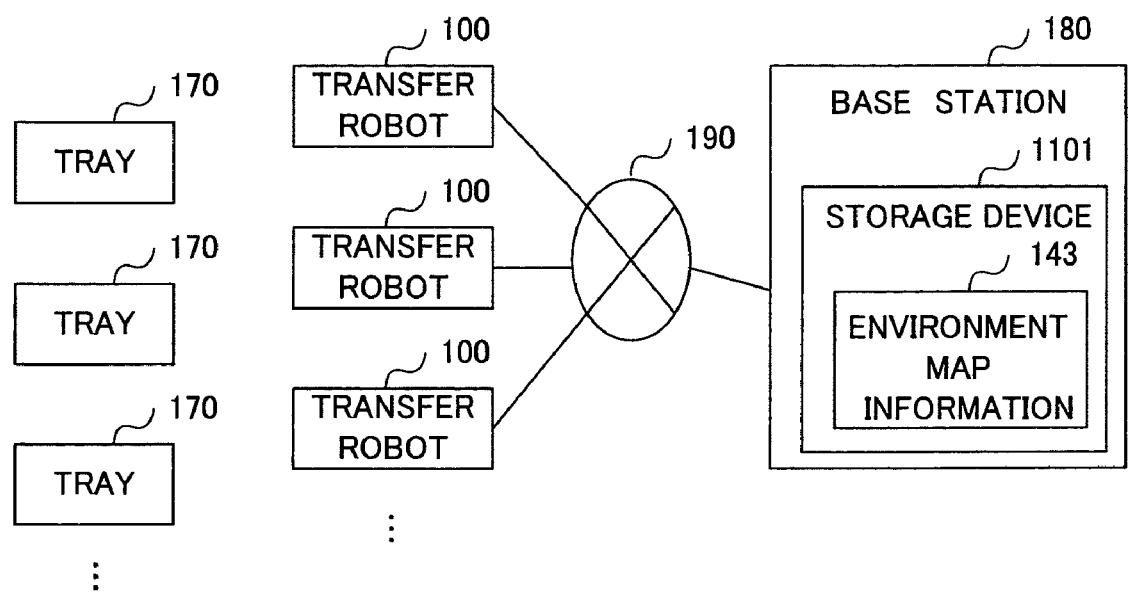
FIG. 11 is an exemplary block diagram illustrating a configuration example in accordance with a second embodiment.

In FIG. 11, each of the plurality of transfer robots 100 is connected to a base station 180 via a communications network 190.

The base station 180 includes a storage device 1101. This storage device 1101 is an arbitrary storage medium such as a HDD or silicon disk. The storage device 1101 includes environment map information 143.

The example operation of each transfer robot 100 is identical to that of the above first embodiment. In other words, when the transfer robot 100 receives information indicating a transfer destination tray, it acquires environment map information 143 from the base station 180, refers to the acquired environment map information 143, and moves to the transfer destination tray. After conducting the process whereby a transfer object is unloaded, the transfer robot 100 sends environment map information 143 updated by itself to the base station 180. The base station 180 overwrites with the received environment map information 143, within the storage device 1101.

Subsequently, in a process equivalent to that of the above step S507, if another transfer robot 100 acquires environment map information 143 from the base station 180, information updated by this process is acquired. At this point, the transfer robot 100 that acquired the new environment map information 143 from the base station 180 may perform the following: in cases where the location of the transfer destination tray acquired in a previous process differs from the location of the transfer destination tray included in the new environment map information 143, the transfer robot 100 searches for a new route from its present location to the location of the transfer destination tray included in the new environment map information 143, and moves following the new route found by the search.

In this case, after the process in the above step S507, the route searching section 129 searches among the most recent tray IDs 303 in new environment map information 143a for a tray ID that matches the tray ID of the transfer destination tray, and extracts the location 301 of the corresponding tray ID 303. Next, the route searching section 129 determines whether or not the target location of the route along which the transfer robot 100 is presently moving matches the extracted location 301. This determination may consider only exact matches to be a match, or alternatively, may consider matches within a certain range to be a match. If this determination results in a match, a process equivalent to the above-described is conducted. In addition, if this determination does not result in a match, i.e., in cases where it is determined that the location of the transfer destination tray has changed, the route searching section 129 may, after conducting the above step S510, search for a route from its present location to the location 301 extracted in the above process, and the process may move to the above step S506.

In this way, each transfer robot 100 becomes able to plan its movement route utilizing the obstruction location information and the tray location information in the most recent environment map information 143 updated by other transfer robots 100. As a result, it becomes possible to transfer objects effectively.

The foregoing embodiments of the invention have been described in detail with reference to the accompanying drawings, but it should be appreciated that concrete configurations are not limited to the embodiments herein, and other modifications and alterations may be made without departing from the spirit of the invention.

For example, in the above-described embodiments, it is assumed that placing an object and taking an object are possible from only one side of one of the trays 170, but the invention is not limited thereto, and may be configured such that placing an object and taking an object are possible from any of a plurality of sides.

In addition, in the above-described embodiments, it is assumed that a short-communication tag as well as a long-communication tag are installed at the respective marks 202 of the tray 170, but the invention is not to be limited thereto. The number of short-communication tags as well as long-communication tags affixed to the tray 170 is arbitrary.

In addition, in the above-described embodiments it is assumed that the transfer robot 100 acquires environment map information 143 from the base station 180, but the invention is not to be limited thereto. For example, the environment map information 143 may also be acquired from another transfer robot 100. In other words, one transfer robot 100 may send environment map information 143 updated in the above-described process to at least one robot among the other transfer robots 100. The transfer robot 100 that receives this environment map information 143 then replaces its own environment map information 143 with the received environment map information 143. Example operation in this case is equivalent to that described in the foregoing.

In addition, in the above-described embodiments, the example of cases wherein the identification information of one of the trays 170 differs from the tag ID retained by the RFID affixed to the tray 170 is described. However, the identification information and tag ID of this tray 170 may also be identical. In such a case, if the identification area 221 (mark) affixed to different trays 170 are identical, identification of the trays 170 cannot be conducted by the stereo camera 112 only. Consequently, in this case it is preferable for updates to the environment map information 143 to leave the field for the tray ID 303 as it is, for example, blank.

In addition, in the above-described embodiments, the transfer destination tray is determined to have been detected in cases where the short-communication tag ID and long-communication tag ID are both detected, but the invention is not to be limited thereto. The transfer destination tray may be determined to have been detected in cases where the identification area 221 (mark) of the transfer destination tray is contained in the image photographed by the camera. In other words, the condition for determining that the transfer destination tray has been detected may be that at least one of either the short-communication tag ID, the long-communication tag ID, or the identification area 221 (mark) must be detected, but is not particularly limited thereto.

In addition, in the above-described embodiments, it is assumed that the present location of the transfer robot is acquired by comparing sensor data (i.e., the location of the target object) to map data, but it should be appreciated that the technology for acquiring the present location is arbitrary. For example, if the passageway along which the transfer robot moves is fixed, the present location of the transfer robot may be acquired by a map matching process, etc., from map information and the movement distance and direction of the transfer robot, acquired by for example a velocity sensor and an angular velocity sensor.

What is claimed is:

1. A mobile device that moves to a movable target object, the mobile device comprising:
   a target object detection unit that detects the target object;
   a driving device that causes the mobile device to move;
   a storage device that stores environment map information including target object location information and map information;
   a present location acquisition unit for acquiring a present location of the mobile device from at least one measured sensor value and the map information;
   a search unit for searching for a route from the present location of the mobile device to the location of the target object, using the map information, the present location of the mobile device, and the target object location information; and
   a drive control unit for controlling the driving device so as to move along the route found by the search;
   wherein the search unit searches for a route from the present location of the mobile device to the target object location information included in the environment map information, and in a case where the target object is detected by the target object detection unit while moving along the route found by the search, the search unit searches for a new route from the present location of the mobile device at the time of detection to a detected location of the target object; and
   wherein the drive control unit causes the mobile device to move along the new route found by the search.

2. The mobile device according to claim 1, further comprising:
   a reader that reads a signal from an RFID tag affixed to the target object,
   wherein the target object detection unit detects the location of the target object from radio wave intensity when the signal was read by the reader.

3. The mobile device according to claim 1, further comprising:
   a camera that photographs a mark affixed to the target object,
   wherein the target object detection unit detects the location of the target object from the location of a region matching the mark, in the image photographed by the camera.

4. The mobile device according to claim 3, wherein:
   multiple different marks are respectively affixed to target objects at a plurality of different locations;
   multiple mark information indicating respective characteristics of the multiple marks is included in the environment map information;
   the target object detection unit further acquires positioning of the target object by determining which among the multiple mark information matches a region included in the image photographed by the camera; and
   the search unit, in a case where the location and the positioning of the target object are acquired by the target object detection unit, searches for a route to move to a location facing in a predetermined direction with respect to the target object.

5. The mobile device according to claim 1, further comprising:
   an updating unit for causing the location of the target object acquired by the target object detection unit to be stored in the storage device as new location information of the target object.

6. The mobile device according to claim 5, further comprising:
   an environment information acquisition unit which acquires environment information indicating surrounding conditions,
   wherein
   the storage device stores environment map information, including location information of the target object, map information, and environment information for respective locations upon the map; and
   the updating unit further causes the environment information for respective locations that was acquired by the environment information acquisition unit to be stored in the storage device as new environment information for those locations.

7. The mobile device according to claim 1, further comprising:
   a handling device that is able to perform at least one of: placing a held object at the target object, and taking an object placed at the target object;
   wherein the handling device, in a case where it is determined that the present location of the mobile device is the location of the target object, performs one of:
   placing a held object at the target object, and taking and holding an object placed at the target object.

8. The mobile device according to claim 1, wherein
   the storage device additionally stores past location information of the target object;
   the search unit, in a case where the target object is not present at the location indicated by the target object location information included in the environment map information, extracts past location information of the target object from the storage device, and searches for a new route from the present location of the mobile device to a location indicated by the extracted location information; and
   the drive control unit causes the mobile device to move along the new route found by the search.

9. The mobile device according to claim 1, wherein:
   the present location acquisition unit extracts, from the map information, map information for a predetermined region that includes the location of the target object acquired by the target object detection unit, determines whether or not the present location of the mobile device is within the region of the extracted map information, and in a case where the determination result is such that the mobile device is not within the region of the extracted map information, acquires the present location of the mobile device from the map information of another region.

10. A mobile device that moves to one of a plurality of movable target objects (hereinafter, destination object), the mobile device comprising:
   a first reader that reads a signal from a first RFID tag that is able to communicate within a predetermined region, and is affixed to each of the target objects;
   a second reader that reads a signal from a second RFID tag that is able to communicate within a region that is wider than that of the first RFID tag, and is affixed to each of the target objects;
   a driving device that moves the mobile device;
   a storage device that stores environment map information, including, for each target object, a first ID retained by the first RFID tag, a second ID retained by the second RFID tag, location information, and map information;
   a present location acquisition unit for acquiring a present location of the mobile device;
   a target object detection unit for detecting the location of the destination object from a respective radio wave intensity of a signal that matches the first ID of the destination object read by the first reader, and a signal that matches the second ID of the destination object read by the second reader;
   a search unit for searching for a route from the present location of the mobile device to the location of the destination object; and
   a drive control unit for controlling the driving device so as to move along the route found by the search;
   and wherein
   the search unit searches for a route from the present location of the mobile device to the location indicated by the target object location information included in the environment map information, and in a case where the destination object is detected by the target object detection unit while mobile along the route found by the search, the search unit searches for a route to move to a detected location;
   in a case where the second reader reads the plurality of second IDs that include the second ID of the destination object, and the target object detection unit acquires the plurality of target object locations that include the location of the destination object, the search unit searches for a new route to move to one of the acquired locations, and the drive control unit moves following the new route;
   in a case where the signal read by the first reader does not match the first ID of the destination object at the location that was the movement destination according to the new route, the search unit searches for a new route to move to another one of the acquired locations, and the drive control unit moves along the new route found by the search; and
   the searching for routes and moving is repeated until the signal read by the first reader matches the first ID of the destination object at the location that was the movement destination according to the new route.

11. A system wherein a plurality of mobile devices that move to a movable target object are mutually connected to each other, wherein:
   each mobile device is a mobile device that moves to a movable target object and includes:
   a target object detection unit for detecting the target object;
   a driving device that causes the mobile device to move;
   a storage device that stores environment map information including target object location information and map information;
   a present location acquisition unit for acquiring a present location of the mobile device from at least one measured sensor value and the map information;
   a search unit that searches for a route from the present location of the mobile device to the location of the target object, using the map information, the present location of the mobile device, and the location of the target object;
   a drive control unit that controls the driving device so as to move along the route found by the search;
   an updating unit;
   an environment map information acquisition unit; and
   an output unit; and wherein
   the search unit searches for a route from the present location of the mobile device to the location indicated by the target object location information included in the environment map information, and in a case where the target object is detected by the target object detection unit while moving along the route found by the search, the search unit searches for a new route from the present location of the mobile device at the time of detection, to a detected location of the target object;
   the drive control unit causes the mobile device to move along the new route found by the search;
   the updating unit causes a target object location acquired by the target object detection unit to be stored in the storage device as new location information;
   the output unit outputs to other mobile devices environment map information that includes the updated location information; and
   the environment map information acquisition unit causes the environment map information input from the other mobile devices to be stored in the storage device as new environment map information.

12. A moving method for moving a mobile device to a movable target object, the mobile device including a driving device that causes the mobile device to move, a storage device that stores environment map information including location information and map information of the target object, and a calculating device, and wherein the calculating device executes the steps of:
   searching for a route from a present location of the mobile device to a location indicated by the target object location information included in the environment map information;
   controlling the driving device so as to move along the route found by the search;
   detecting the target object while moving along the route found by the search;
   searching for a new route from the present location of the mobile device to the target location when the target object is detected; and
   controlling the driving device so as to move along the new route found by the search.

13. A moving program for a mobile device that causes the mobile device to move to a movable target object, the mobile device including a driving device that causes the mobile device to move, a storage device that stores environment map information including location information and map information of the target object, and a calculating device, and wherein the calculating device executes the steps of:

searching for a route from a present location of the mobile device to the location indicated by the target object location information included in the environment map information;
controlling the mobile device so as to move along the route found by the search;
detecting the target object while moving along the route found by search;

searching for a new route from the present location of the mobile device to the target location when the target object is detected; and
controlling the mobile device so as to move along the new route found by the search.

* * * * *